(12) United States Patent
Miura et al.

(10) Patent No.: US 7,822,638 B2
(45) Date of Patent: Oct. 26, 2010

(54) INFORMATION PROVIDING SYSTEM, METHOD THEREOF, AND PROGRAM

(75) Inventors: Hikaru Miura, Tokyo (JP); Yoshihiro Nakahashi, Tokyo (JP); Takuya Omori, Tokyo (JP)

(73) Assignee: Searchteria Co., Ltd., Tokyo (JP)

( * ) Notice: Subject to any disclaimer, the term of this patent is extended or adjusted under 35 U.S.C. 154(b) by 1021 days.

(21) Appl. No.: 10/588,316

(22) PCT Filed: Feb. 15, 2005

(86) PCT No.: PCT/JP2005/002247

§ 371 (c)(1),
(2), (4) Date: Aug. 3, 2006

(87) PCT Pub. No.: WO2005/081155

PCT Pub. Date: Sep. 1, 2005

(65) Prior Publication Data

US 2007/0185763 A1 Aug. 9, 2007

(30) Foreign Application Priority Data

Feb. 19, 2004 (JP) .............................. 2004-042384

(51) Int. Cl.
*G06Q 30/00* (2006.01)
(52) U.S. Cl. ................................................. 705/14.71
(58) Field of Classification Search ................... 705/14, 705/14.71
See application file for complete search history.

(56) References Cited

U.S. PATENT DOCUMENTS

| 6,269,361 | B1 * | 7/2001 | Davis et al. ......................... 1/1 |
| 7,035,812 | B2 * | 4/2006 | Meisel et al. ............. 705/14.54 |
| 2003/0033292 | A1 * | 2/2003 | Meisel et al. .................. 707/3 |
| 2004/0068436 | A1 * | 4/2004 | Boubek et al. ................ 705/14 |

FOREIGN PATENT DOCUMENTS

| JP | 11-003348 A | 1/1999 |
| JP | 2002-092475 A | 3/2002 |
| JP | 2002-133284 A | 5/2002 |
| JP | 2002-329116 A | 11/2002 |
| JP | 2003-233731 A | 8/2003 |

OTHER PUBLICATIONS

"Yahoo! Search Marketing", downloaded May 21, 2010 from http://en.wikipedia.org/wiki/Yahoo!_Search_Marketing.*

* cited by examiner

*Primary Examiner*—Donald L Champagne
(74) *Attorney, Agent, or Firm*—Sughrue Mion, PLLC

(57) ABSTRACT

An information providing system includes a database having advertisement information and a bid amount of money of an advertisement stored correspondingly. Corresponding pieces of advertisement information are select from the database responding to a retrieval request from a terminal to decide an advertisement publishing order based upon the bid amount of money of each of these pieces of advertisement information. The advertisement publishing order is decided based upon a probability that is calculated from a ratio of the bid amount of money of each advertisement that becomes an object of display over a sum of bid amounts of money of advertisements that become an object of display. This allows the displaying order not to be uniquely decided with the bid amount of money.

8 Claims, 24 Drawing Sheets

| INFORMATION CATEGORY NUMBER | (MEANING OF DATA) | INFORMATION PROVIDER NUMBER | (MEANING OF DATA) | BID AMOUNT OF MONEY | INFORMATION CONTENT (COMMODITY, SITE EXPLANATION, ETC.) | BUDGET |
|---|---|---|---|---|---|---|
| 321 | LIFE INSURANCE-RELATED-INFORMATION | 001 | AIU INSURANCE SERVICE | 50 YEN | PLEASE EMPLOY ⌈AIU INSURANCE SERVICE⌋ FOR INSURANCE ESTIMATION! | 1,000,000 YEN |
| 321 | LIFE INSURANCE-RELATED-INFORMATION | 003 | INSURANCE TOTAL PORTAL | 20 YEN | NOW, PLEASE MAKE COMPARISON WITH INSURANCE TOTAL PORTAL! | 100,000 YEN |
| 321 | LIFE INSURANCE-RELATED-INFORMATION | 004 | AKIHABARA LIFE INSURANCE | 10 YEN | AKIHABARA INSURANCE DOES DESIGN INSURANCE THAT SUITS YOU | 300,000 YEN |
| 321 | LIFE INSURANCE-RELATED-INFORMATION | 005 | SECOND LIFE INSURANCE | 10 YEN | ONLY TEN THOUSAND YEN WITH ONE SET OF MEDICAL INSURANCE AND CANCER INSURANCE | 300,000 YEN |
| 321 | LIFE INSURANCE-RELATED-INFORMATION | 006 | ROPPONGI LIFE | 10 YEN | YOU FEEL EASY THROUGH WHOLE LIFE WITH LIFE CARE INSURANCE OF ROPPONGI LIFE. | 300,000 YEN |

FIG. 5

ADMINISTRATION SCREEN

[ RETRIEVING SITE COMPANY REGISTRATION ]

[ RETRIEVAL KEYWORD REGISTRATION ]

[ RETRIEVING SITE COMPANY CATEGORY REGISTRATION ]

[ BILL ISSUE ]

[ PAYMENT SPECIFICATION ISSUE ]

FIG. 6

RETRIEVING SITE COMPANY REGISTRATION SCREEN

| | |
|---|---|
| RETRIEVING SITE NUMBER | 01 |
| COMPANY NAME | A COMPANY |
| ADDRESS | MINATOKU, ROPPONGI, TOKYO |
| PROFIT-SHARING RATIO | 30% |
| KEYWORD RETRIEVAL | YES |
| CATEGORY RETRIEVAL | YES |
| | [ REGISTER ] |

[ RETURN TO ADMINISTRATION SCREEN ]

FIG. 7

| RETRIEVING SITE NUMBER | (MEANING OF DATA) | COMPANY NAME | ADDRESS | PROFIT-SHARING RATIO | KEYWORD RETRIEVAL | CATEGORY RETRIEVAL |
|---|---|---|---|---|---|---|
| 01 | A COMPANY | A COMPANY | | 30% | YES | YES |
| 02 | B COMPANY | B COMPANY | | 30% | YES | YES |
| 03 | C COMPANY | C COMPANY | | 30% | YES | YES |
| 04 | C COMPANY | D COMPANY | | 30% | YES | |
| 05 | A COMPANY | E COMPANY | | 30% | YES | |
| 06 | A COMPANY | F COMPANY | | 30% | YES | |
| 07 | B COMPANY | G COMPANY | | 50% | | YES |
| 08 | B COMPANY | H COMPANY | | 50% | | YES |

FIG. 9

INFORMATION PROVIDER ADMINISTRATION SCREEN

[INFORMATION PROVIDER REGISTRATION]

[PUBLICATION CONDITION REGISTRATION]

FIG. 10

RETRIEVAL KEYWORD REGISTRATION SCREEN

| INFORMATION CATEGORY NUMBER | | RETRIEVAL KEYWORD | |
|---|---|---|---|
| 100 | ENTERTAIMENT-RELATED-INFORMATION | MUSIC<br>MOVIE<br>COMIC | [REGISTER] |
| 200 | AUTOMOBILE-RELATED-INFORMATION | CAR<br>AUTOMOBILE<br>NEW CAR<br>FOREIGN-MADE CAR<br>AUTOMOBILE PROCUREMENT<br>USED-CAR SALES | [REGISTER] |

[RETURN TO ADMINISTRATION SCREEN]

FIG. 11

| INFORMATION PROVIDER NUMBER | (MEANING OF DATA) | COMPANY NAME | ADDRESS |
|---|---|---|---|
| 001 | AIU INSURANCE SERVICE | AIU INSURANCE SERVICE | |
| 003 | INSURANCE TOTAL PORTAL | INSURANCE TOTAL PORTAL | |
| 001 | AIU INSURANCE SERVICE | AIU INSURANCE SERVICE | |
| 003 | INSURANCE TOTAL PORTAL | INSURANCE TOTAL PORTAL | |
| 004 | AKIHABARA LIFE INSURANCE | AKIHABARA LIFE INSURANCE | |
| 005 | SECOND LIFE INSURANCE | SECOND LIFE INSURANCE | |
| 006 | ROPPONGI LIFE | ROPPONGI LIFE | |
| 001 | AIU INSURANCE SERVICE | AIU INSURANCE SERVICE | |
| 003 | INSURANCE TOTAL PORTAL | INSURANCE TOTAL PORTAL | |
| 101 | AKIBA NONLIFE INSURANCE | AKIBA NONLIFE INSURANCE | |
| 102 | SAFETY MARINE INSURANCE | SAFETY MARINE INSURANCE | |
| 103 | LEMON FIRE INSURANCE | LEMON FIRE INSURANCE | |
| 104 | CROSS NONLIFE INSURANCE | CROSS NONLIFE INSURANCE | |

FIG. 13

| RETRIEVAL KEYWORD | INFORMATION CATEGORY NUMBER | (MEANING OF DATA) |
|---|---|---|
| MUSIC | 100 | ENTERTAINMENT-RELATED-INFORMATION |
| MOVIE | 100 | ENTERTAINMENT-RELATED-INFORMATION |
| COMIC | 100 | ENTERTAINMENT-RELATED-INFORMATION |
| CAR | 200 | AUTOMOBILE-RELATED-INFORMATION |
| AUTOMOBILE | 200 | AUTOMOBILE-RELATED-INFORMATION |
| NEW CAR | 200 | AUTOMOBILE-RELATED-INFORMATION |
| FOREIGN-MADE CAR | 200 | AUTOMOBILE-RELATED-INFORMATION |
| AUTOMOBILE PROCUREMENT | 200 | AUTOMOBILE-RELATED-INFORMATION |
| USE-CAR SALES | 200 | AUTOMOBILE-RELATED-INFORMATION |
| BANK | 310 | BANK-RELATED-INFORMATION |
| TRUST BANK | 311 | TRUST BANK-RELATED-INFORMATION |
| INSURANCE | 320 | INSURANCE-RELATED-INFORMATION |
| INSURANCE ESTIMATE | 320 | INSURANCE-RELATED-INFORMATION |
| LIFE INSURANCE | 321 | LIFE INSURANCE-RELATED-INFORMATION |
| LIFE INSURANCE | 321 | LIFE INSURANCE-RELATED-INFORMATION |
| NONLIFE INSURANCE | 322 | NONLIFE INSURANCE-RELATED-INFORMATION |
| NONLIFE INSURANCE | 322 | NONLIFE INSURANCE-RELATED-INFORMATION |
| AUTOMOBILE INSURANCE | 322 | NONLIFE INSURANCE-RELATED-INFORMATION |
| SECURITIES | 330 | SECURITIES-RELATED-INFORMATION |
| STOCK INVESTMENT | 330 | SECURITIES-RELATED-INFORMATION |

FIG. 16

| RETRIEVING SITE NUMBER | (MEANING OF DATA) | RETRIEVING SITE CATEGORY NUMBER | (MEANING OF DATA) | INFORMATION CATEGORY NUMBER | (MEANING OF DATA) |
|---|---|---|---|---|---|
| 01 | A COMPANY | 001 | MISIC | 100 | ENTERTAINMENT-RELATED-INFORMATION |
| 01 | A COMPANY | 002 | MOVIE | 100 | ENTERTAINMENT-RELATED-INFORMATION |
| 01 | A COMPANY | 003 | CAR | 200 | AUTOMOBILE-RELATED-INFORMATION |
| 01 | A COMPANY | 004 | BANK | 310 | BANK-RELATED-INFORMATION |
| 01 | A COMPANY | 005 | INSURANCE | 320 | INSURANCE-RELATED-INFORMATION |
| 02 | B COMPANY | 01 | CD, DVD, VIDEO | 100 | ENTERTAINMENT-RELATED-INFORMATION |
| 02 | B COMPANY | 02 | MOTOR SPORT | 200 | AUTOMOBILE-RELATED-INFORMATION |
| 02 | B COMPANY | 03 | INSURANCE | 320 | INSURANCE-RELATED-INFORMATION |
| 02 | B COMPANY | 04 | LIFE INSURANCE | 321 | LIFE INSURANCE-RELATED-INFORMATION |
| 02 | B COMPANY | 05 | NONLIFE INSURANCE | 322 | NONLIFE INSURANCE-RELATED-INFORMATION |
| 03 | C COMPANY | 0001 | NEW CAR INFORMATION | 200 | AUTOMOBILE-RELATED-INFORMATION |
| 03 | C COMPANY | 0002 | FAVORITE-CAR BUYING-UP ASSESMENT | 200 | AUTOMOBILE-RELATED-INFORMATION |
| 03 | C COMPANY | 0003 | USED-CAR SALES | 200 | AUTOMOBILE-RELATED-INFORMATION |

FIG. 18

PUBLICATION CONDITION SCREEN

INFORMATION PROVIDER NUMBER [001]　AIU INSURANCE SERVICE

- INFORMATION CATEGORY NUMBER [320] INSURANCE-RELATED-INFORMATION
- BID AMOUNT OF MONEY [40] YEN　BUDGET [1,000,000] YEN
- INFORMATION CONTENT [PLEASE EMPLOY 「AIU INSURANCE SERVICE」 FOR INSURANCE ESTIMATION]　[REGISTER]

- INFORMATION CATEGORY NUMBER [321] LIFE INSURANCE-RELATED-INFORMATION
- BID AMOUNT OF MONEY [50] YEN　BUDGET [1,000,000] YEN
- INFORMATION CONTENT [PLEASE EMPLOY 「AIU INSURANCE SERVICE」 FOR INSURANCE ESTIMATION]　[REGISTER]

- INFORMATION CATEGORY NUMBER [322] NONLIFE INSURANCE-RELATED-INFORMATION
- BID AMOUNT OF MONEY [40] YEN　BUDGET [1,000,000] YEN
- INFORMATION CONTENT [PLEASE EMPLOY 「AIU INSURANCE SERVICE」 FOR INSURANCE ESTIMATION]　[REGISTER]

[RETURN TO INFORMATION PROVIDER ADMINISTRATION SCREEN]

FIG. 19

| INFORMATION CATEGORY NUMBER | (MEANING OF DATA) | INFORMATION PROVIDER NUMBER | (MEANING OF DATA) | BID AMOUNT OF MONEY | INFORMATION CONTENT (COMMODITY, SITE EXPLANATION, ETC.) | BUDGET |
|---|---|---|---|---|---|---|
| 320 | INSURANCE-RELATED-INFORMATION | 001 | AIU INSURANCE SERVICE | 40 YEN | PLEASE EMPLOY [AIU INSURANCE SERVICE] FOR INSURANCE ESTIMATION! | 1,000,000 YEN |
| 320 | INSURANCE-RELATED-INFORMATION | 003 | INSURANCE TOTAL PORTAL | 10 YEN | NOW, PLEASE MAKE COMPARISON WITH INSURANCE TOTAL PORTAL! | 500,000 YEN |
| 321 | LIFE INSURANCE-RELATED-INFORMATION | 001 | AIU INSURANCE SERVICE | 50 YEN | PLEASE EMPLOY [AIU INSURANCE SERVICE] FOR INSURANCE ESTIMATION! | 1,000,000 YEN |
| 321 | LIFE INSURANCE-RELATED-INFORMATION | 003 | INSURANCE TOTAL PORTAL | 20 YEN | NOW, PLEASE MAKE COMPARISON WITH INSURANCE TOTAL PORTAL! | 100,000 YEN |
| 321 | LIFE INSURANCE-RELATED-INFORMATION | 004 | AKIHABARA LIFE INSURANCE | 10 YEN | AKIHABARA INSURANCE DOES DESIGN INSURANCE THAT SUITS YOU | 300,000 YEN |
| 321 | LIFE INSURANCE-RELATED-INFORMATION | 005 | SECOND LIFE INSURANCE | 10 YEN | ONLY TEN THOUSAND YEN WITH ONE SET OF MEDICAL INSURANCE AND CANCER INSURANCE | 300,000 YEN |
| 321 | LIFE INSURANCE-RELATED-INFORMATION | 006 | ROPPONGI LIFE | 10 YEN | YOU FEEL EASY THROUGH WHOLE LIFE WITH LIFE CARE INSURANCE OF ROPPONGI LIFE. | 300,000 YEN |
| 322 | NONLIFE INSURANCE-RELATED-INFORMATION | 001 | AIU INSURANCE SERVICE | 40 YEN | PLEASE EMPLOY [AIU INSURANCE SERVICE] FOR INSURANCE ESTIMATION! | 1,000,000 YEN |
| 322 | NONLIFE INSURANCE-RELATED-INFORMATION | 003 | INSURANCE TOTAL PORTAL | 30 YEN | NOW, PLEASE MAKE COMPARISON WITH INSURANCE TOTAL PORTAL! | 100,000 YEN |
| 322 | NONLIFE INSURANCE-RELATED-INFORMATION | 101 | AKIBA NONLIFE INSURANCE | 10 YEN | NONLIFE INSURANCE OF AKIBA GROUP | 300,000 YEN |
| 322 | NONLIFE INSURANCE-RELATED-INFORMATION | 102 | SAFETY MARINE INSURANCE | 10 YEN | SAFETY MARINE INSURANCE FOR FIRE INSURANCE AND MARINE INSURANCE | 300,000 YEN |
| 322 | NONLIFE INSURANCE-RELATED-INFORMATION | 103 | LEMON FIRE INSURANCE | 10 YEN | YOU ARE FAMILIAR WITH LEMON FIRE INSURANCE IN COMMERCIAL PROGRAM. | 300,000 YEN |
| 322 | NONLIFE INSURANCE-RELATED-INFORMATION | 104 | CROSS NONLIFE INSURANCE | 10 YEN | GOODS ARE BEING PRESENTED TO 100 PERSONS IN ORDER OF APPLICATION. | 50,000 YEN |

FIG. 21

| INFORMATION CATEGORY NUMBER | (MEANING OF DATA) | INFORMATION PROVIDER NUMBER | (MEANING OF DATA) | BID AMOUNT OF MONEY | INFORMATION CONTENT (COMMODITY, SITE EXPLANATION, ETC.) | BUDGET |
|---|---|---|---|---|---|---|
| 321 | LIFE INSURANCE-RELATED-INFORMATION | 001 | AIU INSURANCE SERVICE | 50 YEN | PLEASE EMPLOY「AIU INSURANCE SERVICE」FOR INSURANCE ESTIMATION! | 1,000,000 YEN |
| 321 | LIFE INSURANCE-RELATED-INFORMATION | 003 | INSURANCE TOTAL PORTAL | 20 YEN | NOW, PLEASE MAKE COMPARISON WITH INSURANCE TOTAL PORTAL! | 100,000 YEN |
| 321 | LIFE INSURANCE-RELATED-INFORMATION | 004 | AKIHABARA LIFE INSURANCE | 10 YEN | AKIHABARA INSURANCE DOES DESIGN INSURANCE THAT SUITS YOU | 300,000 YEN |
| 321 | LIFE INSURANCE-RELATED-INFORMATION | 005 | SECOND LIFE INSURANCE | 10 YEN | ONLY TEN THOUSAND YEN WITH ONE SET OF MEDICAL INSURANCE AND CANCER INSURANCE | 300,000 YEN |
| 321 | LIFE INSURANCE-RELATED-INFORMATION | 006 | ROPPONGI LIFE | 10 YEN | YOU FEEL EASY THROUGH WHOLE LIFE WITH LIFE CARE INSURANCE OF ROPPONGI LIFE. | 300,000 YEN |

FIG. 23

BILL ISSUE SCREEN

INFORMATION PROVIDER NUMBER [01] A COMPANY

OBJECT PERIOD [2004/1] FOR YEAR/MONTH

[CHARGED AMOUNT-OF-MONEY CONFIRMATION BUTTON]

[RETURN TO ADMINISTRATION SCREEN]

FIG. 24

CHARGED AMOUNT-OF-MONEY CCONFIRMATION SCREEN

AIU INSURANCE SERVICE

YOKOHAMA CITY, KANAGAWA PREFECTURE

INFORMATION PUBLICATION FEE BILL

WE CHARGE 105,000 YEN FOR SERVICES DURING THE TIME OF JANUARY, 2004 AS FOLLOWS.

| TOTAL OF CHARGED AMOUNT OF MONEY | COMSUMPTION TAX | TOTAL |
|---|---|---|
| 100,000 | 5,000 | 105,000 |

[PRINTING BUTTON]

[RETURN TO ADMINISTRATION SCREEN]   [RETURN TO BILL ISSUE SCREEN]

FIG. 26

PAYMENT SPECIFICATION ISSUE SCREEN

RETRIEVING SITE NUMBER     | 01 |   A COMPANY

OBJECT PERIOD     | 2004/1 |   FOR YEAR/MONTH

| PAYMENT AMOUNT-OF-MONEY CONFIRMATION BUTTON |

| RETURN TO ADMINISTRATION SCREEN |

FIG. 27

PAYMENT AMOUNT-OF-MONEY CCONFIRMATION SCREEN

A COMPANY

MINATOKU, ROPPONGI, TOKYO

INFORMATION PUBLICATION FEE PAYMENT SPECIFICATION

WE PAY 31,500 YEN FOR SERVICES DURING TIME OF JANUARY, 2004 AS FOLLOWS.

| TOTAL OF PAYMENT AMOUNT OF MONEY | COMSUMPTION TAX | TOTAL |
|---|---|---|
| 30,000 | 1,500 | 31,500 |

| PRINTING BUTTON |

| RETURN TO ADMINISTRATION SCREEN | | RETURN TO PAYMENT SPECIFICATION SCREEN |

INFORMATION PROVIDING SYSTEM, METHOD THEREOF, AND PROGRAM

This application claims priority from PCT Application No. PCT/JP2005/002247 filed Feb. 15, 2005, and from Japanese Patent Application No. 2004-042384 filed Feb. 19, 2004, which applications are incorporated herein by reference.

APPLICABLE FIELD IN THE INDUSTRY

The present invention relates to a technology of providing information for a purpose of displaying information in information processing terminals such as a computer and a mobile telephone, and more particularly to a technology of information display, which employs a probability based upon a bid amount of money of information, thereby to decide a displaying order of information.

BACKGROUND ART

Conventionally, there is a system in which retrieving information by employing an internet etc. allows information such as an advertisement to be displayed as a result of this retrieval. In this system, the order decided according to a bid amount of money of information such as the advertisement is assumed to be an information displaying order. That is, the larger the bid amount of money is, the higher the displaying order ranks, and in other word, the smaller the bid amount of money is, the lower the order in which information is displayed ranks, which means that this displaying order is decided in a fixed manner. Additionally, some systems in which the displaying order is decided in consideration of a coefficient such as a popularity degree of its information are similar to the above-mentioned system in a sense that the displaying order is based upon the order decided by the bid amount of money.

DISCLOSURE OF THE INVENTION

Problems to be Solved by the Invention

However, in the conventional system mentioned above, for example, an information provider such as an advertiser who is inferior in a budget scale or a profit ratio is not able to offer a large bid amount of money, and the displaying order ranks low as a result, which is also decided in a fixed manner, so the above information results in being constantly displayed in the rear side where a recognition effect is low. In particular, there exists a restrain to a display screen in the mobile terminal such as a mobile telephone, which remarkably brings the foregoing defect to light.

For this reason, the above system is not a system in which a great power can be exhibited, from a viewpoint of acquisition of a wide layer of customers and continuous utilization. In addition hereto, it is not a system in which a great power can be exhibited, also from a viewpoint of allowing a retrieving person's interest to be maintained because there exists no change in the retrieval result when a movement in the bid is little.

Thereupon, the present invention has been accomplished in consideration of the above-mentioned problems, and an object thereof is to provide a technology of providing information that allows the high-ranked displaying opportunity to be given to all advertisements while the bid amount of money is taken into consideration.

Further, an object of the present invention is to provide a technology of providing information that allows the order for displaying information to be changed and a retrieving person's interest to be maintained also in a case where no change in information to be provided exists, due to little movement in the bid etc. or the like.

Means to Solve the Problem

The first invention for solving the above-mentioned problem, which is an information providing system for providing information responding to a retrieval request from a terminal, is characterized in including a database having information, which an information provider provides, and a bid amount of money of said information stored correspondingly, a displaying order deciding means for selecting corresponding pieces of information from said database responding to the retrieval request of information to decide a displaying order of said information based upon the bid amount of money that corresponds to each of these pieces of information, and a means for transmitting information to the terminal so that information is displayed in said decided displaying order.

The second invention for solving the above-mentioned problem is characterized in that in the above-mentioned first invention, the displaying order deciding means is configured to decide the displaying order of information based upon a probability that is calculated from the ratio of the bid amount of money of each selected information over the sum of bid amounts of money of selected pieces of information.

The third invention for solving the above-mentioned problem is characterized in that in the above-mentioned second invention, the displaying order deciding means comprises: a sum-of-bid-amount-of-money calculating means for acquiring the bid amount of money that correspond to information to calculate a sum of these bid amounts of money; a ratio calculating means for calculating a ratio of the bid amount of money of information over said sum of bid amounts of money information by information; and a displaying order deciding means for deciding one piece of information, which is displayed, from pieces of information based upon a probability proportional to magnitude of said calculated ratio of each information; and said displaying order deciding means is configured so that: in a case where the number of selected pieces of information is m and the number of display is n, said sum-of-bid-amount-of-money calculating means calculates a sum of bid amounts of money of m pieces of information, said ratio calculating means calculates a ratio of the bid amount of money of each of m pieces of information, and said displaying order deciding means decides information of which the displaying order is a first rank based upon a probability proportional to magnitude of each of said ratios of m pieces of information; continuously, said sum-of-bid-amount-of-money calculating means calculates a sum of bid amounts of money of (m−1) pieces of information except the bid amount of money of the information decided in said displaying order deciding means, said ratio calculating means calculates a ratio of the bid amount of money of each of (m−1) pieces of information except the bid amount of money of the information decided in said displaying order deciding means, and said displaying order deciding means decides information of which the displaying order is a second rank based upon a probability proportional to magnitude of each of said ratios of (m−1) pieces of information; this computation is performed until information of which the displaying order is an (n−1)-th rank is decided; and finally, said sum-of-bid-amount-of-money calculating means calculates a sum of bid amounts of money of (m−n+1) pieces of information except the bid amount of money of the information decided in said displaying order deciding means, said ratio calculating means calculates a ratio of the bid amount of money of each of (m−n+1)

pieces of information except the information decided in said displaying order deciding means, and said displaying order deciding means decides information of which the displaying order is an n-th rank based upon a probability proportional to magnitude of each of said ratios of (m−n+1) pieces of information, thereby allowing the displaying order of information ranging from a first rank up to an n-th rank to be decided.

The fourth invention for solving the above-mentioned problem is characterized in that in the above-mentioned second or third invention, the information providing system comprises: a means for recording the number of times of display of each information in the terminal; a means for recording the click number of each information displayed in the terminal; and a means for calculating a ratio of the click number to said number of times of display for each selected information; and the displaying order deciding means decides the displaying order of information based upon a probability that is calculated from a ratio of the bid amount of money of information over said sum of bid amounts of money and a ratio of the click number to said number of times of display.

The fifth invention for solving the above-mentioned problem is characterized in that a program of an information providing server for providing information responding to a retrieval request from a terminal, characterized in causing said server to function as; a displaying order deciding means for, responding to the retrieval request of information, selecting corresponding pieces of information from a database having information, which an information provider provides, and a bid amount of money of said information stored correspondingly to decide the displaying order of said information based upon the bid amount of money that correspond to each of theses pieces of information; and a means for transmitting information to the terminal so that information is displayed in said decided displaying order.

The sixth invention in the above-mentioned fifth invention for solving the above-mentioned problem is characterized in causing said displaying order deciding means to decide the displaying order of information based upon a probability that is calculated from a ratio of the bid amount of money of each selected information over a sum of bid amounts of money of selected pieces of information.

The seventh invention in the above-mentioned sixth invention for solving the above-mentioned problem is characterized in causing said displaying order deciding means to function as: a sum-of-bid-amount-of-money calculating means for acquiring the bid amount of money that corresponds to information to calculate a sum of these bid amounts of money; a ratio calculating means for calculating a ratio of the bid amount of money of information over said sum of bid amounts of money information by information; and a displaying order deciding means for deciding one piece of information, which is displayed, from pieces of information based upon a probability proportional to magnitude of said calculated ratio of each information; and causing said displaying order deciding means to operate so that: in a case where the number of selected information is m, and the number of the display is n, said sum-of-bid-amount-of-money calculating means calculates a sum of bid amounts of money of m pieces of information, said ratio calculating means calculates a ratio of the bid amount of money of each of m pieces of information, and said displaying order deciding means decides information of which the displaying order is a first rank based upon a probability proportional to magnitude of each of said ratios of m pieces of information; continuously, said sum-of-bid-amount-of-money calculating means calculates a sum of bid amounts of money of (m−1) pieces of information except the bid amount of money of the information decided in said displaying order deciding means, said ratio calculating means calculates a ratio of the bid amount of money of each of (m−1) pieces of information except the bid amount of money of the information decided in said displaying order deciding means, and said displaying order deciding means decides information of which the displaying order is a second rank based upon a probability proportional to magnitude of each of said ratios of (m−1) pieces of information; this computation is performed until information of which the displaying order is an (n−1)-th rank is decided; and finally, said sum-of-bid-amount-of-money calculating means calculates a sum of bid amounts of money of (m−n+1) pieces of information except the bid amount of money of the information decided in said displaying order deciding means, said ratio calculating means calculates a ratio of the bid amount of money of each of (m−n+1) pieces of information except the bid amount of money of the information decided in said displaying order deciding means, and said displaying order deciding means decides information of which the displaying order is an n-th rank based upon a probability proportional to magnitude of each of said ratios of (m−n+1) pieces of information, thereby allowing the displaying order of information ranging from a first rank up to an n-th rank to be decided.

The eighth invention in the above-mentioned sixth or seventh invention for solving the above-mentioned problem is characterized in causing: said server to function as: a means for recording the number of times of display of each information in a terminal; a means for recording the click number of each information displayed in the terminal; and a means for calculating a ratio of the click number to said number of times of display for each selected information; and said displaying order deciding means to operate so that the displaying order of information is decided based upon a probability that is calculated from a ratio of the bid amount of money of information over said sum of bid amounts of money and a ratio of the click number to said number of times of display.

The ninth invention for solving the above-mentioned problem is characterized in that an information providing method of providing information responding to a retrieval request from a terminal, characterized in comprising: a displaying order deciding step of selecting pre-stored pieces of information responding to the retrieval request of information to decide a displaying order of information based upon a bid amount of money that corresponds to each of these pieces of information; and a step of transmitting information to the terminal so that information is displayed in said decided displaying order.

The tenth invention for solving the above-mentioned problem is characterized in that in the above-mentioned ninth invention, the displaying order deciding step is a step of deciding the displaying order of information based upon a probability that is calculated from a ratio of the bid amount of money of each selected information over a sum of bid amounts of money of selected pieces of information.

The eleventh invention for solving the above-mentioned problem is characterized in that in the above-mentioned tenth invention, in said displaying order deciding step: in a case where the number of selected information is m, and the number of display is n, a sum of bid amounts of money of m pieces of information is calculated, a ratio of the bid amount of money of information over said sum of bid amounts of money of m pieces of information is calculated, and information of which the displaying order is a first rank is decided based upon a probability proportional to magnitude of each of said ratios of m pieces of information; continuously, a sum of bid amounts of money of (m−1) pieces of information except the bid amount of money of said decided information is calculated, a ratio of the bid amount of money of information over said sum of bid amounts of money of (m−1) pieces of information except the bid amount of money of said decided information is calculated, and information of which the displaying order is a second rank is decided based upon a probability proportional to magnitude of each of said ratios of (m−1) pieces of information; this computation is performed until information of which the displaying order is an (n−1)-th rank is decided; and finally, a sum of bid amounts of money of (m−n+1) pieces of information except the bid amount of money of said decided information is calculated, a ratio of the bid amount of money of information over said sum of bid amounts of money of (m−n+1) pieces of information except said decided information is calculated, and information of which the displaying order is an n-th rank is decided based upon a probability proportional to magnitude of each of said ratios of (m−n+1) pieces of information, thereby allowing the displaying order of information ranging from a first rank up to an n-th rank to be decided.

In the above-mentioned tenth or eleventh invention, the twelfth invention for solving the above-mentioned problem is characterized in including the steps of: recording the number of times of display of each information in a terminal and the click number of each information displayed in the terminal; and deciding the displaying order of information based upon a probability that is calculated from a ratio of the bid amount of money of information over said sum of bid amounts of money and a ratio of the click number to said number of times of display.

The thirteenth invention for solving the above-mentioned problem is characterized in an advertisement information publishing system for providing advertisement information responding to a retrieval request from a terminal, characterized in comprising: a database having advertisement information and a bid amount of money of said advertisement stored correspondingly; an advertisement publishing order deciding means for, responding to the retrieval request from the terminal, selecting corresponding pieces of advertisement information from said database to deciding an advertisement publishing order of said advertisement information based upon a bid amount of money of each of these pieces of advertisement information; and a means for transmitting advertisement information to the terminal so that an advertisement is displayed in said decided advertisement publishing order.

In the above-mentioned thirteenth invention, the fourteen invention for solving the above-mentioned problem is characterized in that said advertisement publishing order deciding means is configured so as to decide the advertisement publishing order based upon a probability that is calculated from a ratio of the bid amount of money of each advisement that becomes an object of display over a sum of bid amounts of money of advertisements that become an object of display.

The fifteenth invention for solving the above-mentioned problem is an advertisement information publishing method of providing advertisement information responding to a retrieval request from a terminal, characterized in comprising: a step of selecting corresponding pieces of advertisement information responding to the retrieval request from the terminal; an advertisement publishing order deciding step of deciding an advertisement publishing order of advertisement information based upon the bid amount of money of each of said selected pieces of advertisement information; and a step of transmitting advertisement information to the terminal so that an advertisement is displayed in said decided advertisement publishing order.

In the above-mentioned fourteen invention, the sixteenth invention for solving the above-mentioned problem is characterized in that said advertisement publishing order deciding step is a step of deciding the advertisement publishing order based upon a probability that is calculated from a ratio of the bid amount of money of each advisement that becomes an object of display over a sum of bid amounts of money of advertisements that become an object of display.

The seventeenth invention for solving the above-mentioned problem is a controlling program of an information processing unit for providing advertisement information responding to a retrieval request from a terminal, characterized in causing said information processing unit to function as: an advertisement publishing order deciding means for, responding to the retrieval request from the terminal, selecting corresponding pieces of advertisement information from a database having advertisement information and a bid amount of money of an advertisement stored correspondingly to deciding an advertisement publishing order of said advertisement information based upon the bid amount of money of each of these pieces of advertisement information; and a means for transmitting advertisement information to the terminal so that an advertisement is displayed in said decided advertisement publishing order.

In the above-mentioned sixteenth invention, the eighteenth invention for solving the above-mentioned problem is characterized in causing said information processing unit to function as a means for deciding the advertisement publishing order based upon a probability that is calculated from a ratio of the bid amount of money of each advertisement that becomes an object of display over a sum of bid amounts of money of advertisements that become an object of display.

Effects of the Invention

The present invention produces an excellent effect of enabling the high-ranked displaying opportunity to be given to all pieces of information while the bid amount of money is taken into consideration.

Further, the present invention enables a retrieving person to be given the opportunity of contacting much more pieces of information.

BRIEF DESCRIPTION OF THE DRAWINGS

FIG. 1 is a configuration view illustrating one embodiment of the present invention.
FIG. 2 is a configuration view illustrating one embodiment of the present invention.
FIG. 3 is a configuration view illustrating one embodiment of the present invention.
FIG. 4 is an operational flowchart of registering a retrieving site company.
[FIG.5]
FIG. 5 is a view illustrating one example of an administration screen.
[FIG.6]
FIG. 6 is a view illustrating one example of a retrieving site company registration screen.
[FIG.7]
FIG. 7 is a view illustrating one example of a retrieving site company database.

FIG. 8 is an operational flowchart of registering an information provider.

[FIG.9]

FIG. 9 is a view illustrating one example of an information provider administration screen.

[FIG.10]

FIG. 10 is a view illustrating one example of an information provider registration screen.

[FIG.11]

FIG. 11 is a view illustrating one example of an information provider database.

FIG. 12 is an operational flowchart of registering a linking of a retrieval keyword and an information category.

[FIG.13]

FIG. 13 is a view illustrating one example of a retrieval keyword information category mapping-database.

FIG. 14 is an operational flowchart of registering a linking of the information category and a retrieving site company category.

FIG. 15 is a view illustrating one example of a retrieving site company category registration screen.

[FIG.16]

FIG. 16 is a view illustrating one example of a retrieving site company category information category mapping-database.

FIG. 17 is an operational flowchart of registering publishing conditions.

[FIG.18]

FIG. 18 is a view illustrating one example of a publishing condition registration screen.

[FIG.19]

FIG. 19 is a view illustrating one example of a publishing condition database.

FIG. 20 is an operational flowchart of processing a retrieval result display.

[FIG.21]

FIG. 21 is a view for explaining a process of a publishing order decision.

FIG. 22 is a flowchart of an information publication fee charge.

[FIG.23]

FIG. 23 is a view illustrating one example of a bill issue screen.

[FIG.24]

FIG. 24 is a view illustrating one example of a charged amount-of-money confirmation screen.

FIG. 25 is an operational flowchart of an information publication fee payment.

[FIG.26]

FIG. 26 is a view illustrating one example of a payment specification issue screen.

[FIG.27]

FIG. 27 is a view illustrating one example of a payment amount-of-money confirmation screen.

FIG. 28 is a general block configuration view of an information administrating server 3 having a means for deciding the displaying order of the present invention implemented.

DESCRIPTION OF NUMERALS 1 retrieving person's personal computer (including mobile telephone)
2 retrieving server
3 information administrating server
4 information administrating personal computer
5 information provider's personal computer

BEST MODE FOR CARRYING OUT THE INVENTION

The present invention links, for example, the ratio of the bid amount of money of each information over the sum of bid amounts of money of all pieces of information that are to be displayed within an identical frame, to a displaying priority-order decision. Hereinafter, a specific embodiment of the present invention will be explained.

Embodiment 1

The embodiment of the present invention will be explained.

Figure 1:
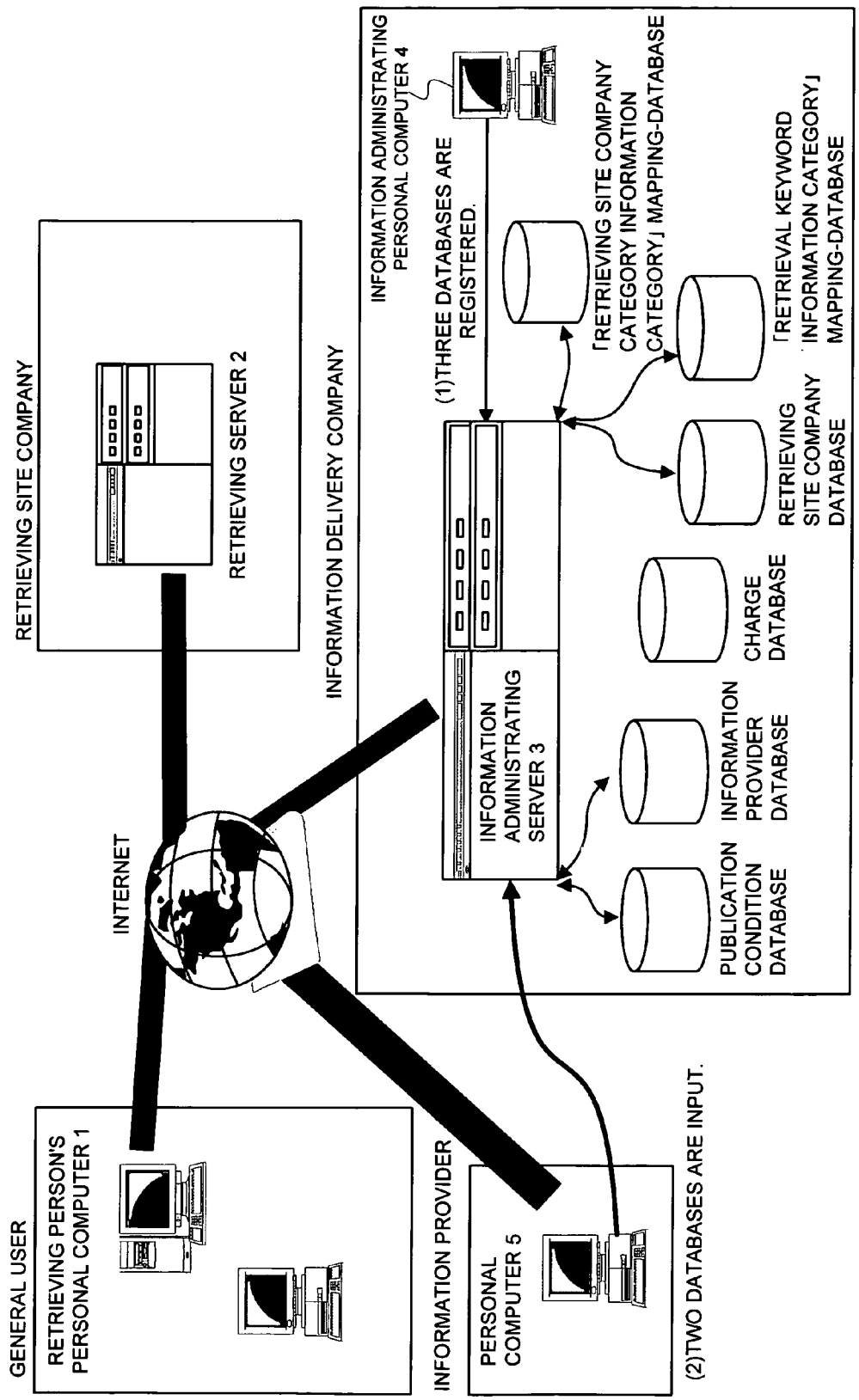
[FIG.1]
Figure 2:
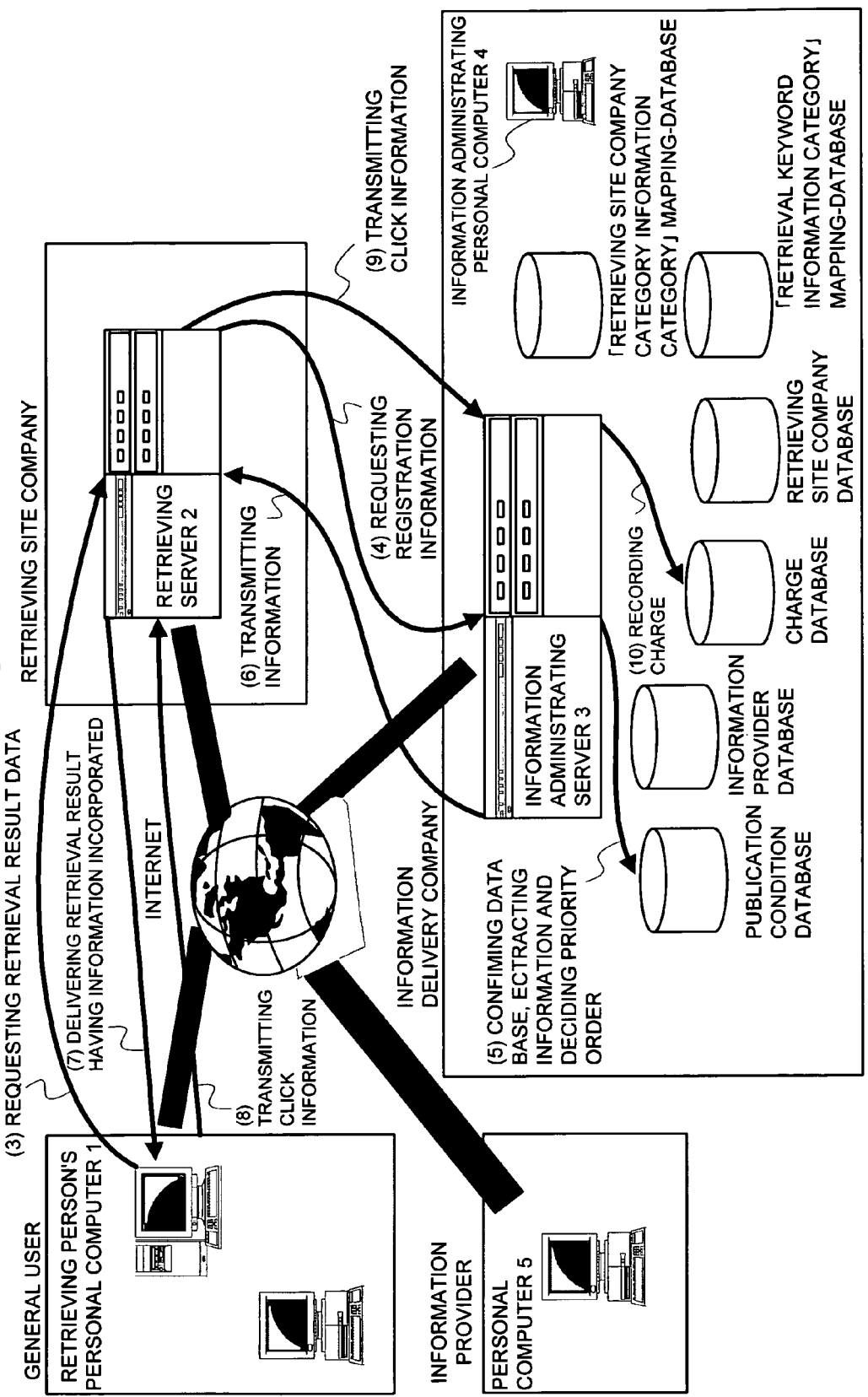
[FIG.2]
Figure 3:
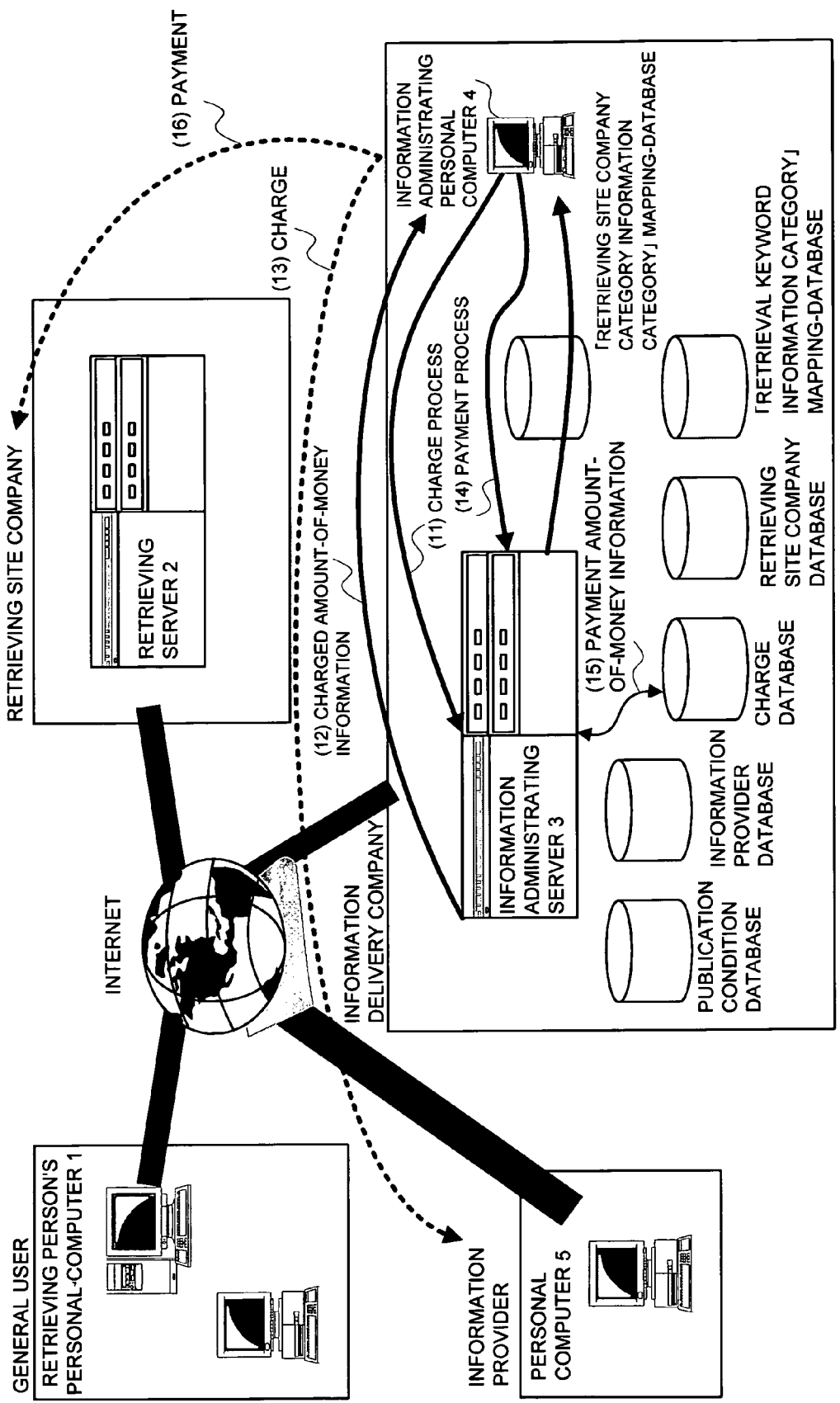
[FIG.3]

Each of FIG. 1, FIG. 2 and FIG. 3 is a configuration view illustrating one embodiment of the present invention.

As shown in FIG. 1, this system includes a retrieving person's personal computer (including a mobile telephone) 1, a retrieving server 2, an information administrating server 3, an information administrating personal computer 4, and an information provider's personal computer 5.

In such a configuration, at first, a flow of information will be explained by making a reference to the accompanied drawings.

At first, as shown in FIG. 1, (1) an access to the information administrating server 3 is made from the information administrating personal computer 4, thereby to register a retrieving site company database, a retrieval keyword information category mapping-database, and a retrieving site company category information category mapping-database.

(2) An access to the information administrating server 3 is made from the information provider's personal computer 5, thereby to register an information provider database and a publication condition database.

Continuously, as shown in FIG. 2, (3) a retrieval result is requested of the retrieving server 2 from the retrieving person's personal computer (including a mobile telephone) 1.

(4) The retrieving server 2 requests registration information, which meets the conditions, of the information administrating server 3.

(5) The information administrating server 3 confirms the publication condition database, selects information that meets the requested condition, and decides the displaying priority order.

(6) The information decided in the previous item is transmitted from the information administrating server 3 to the retrieving server 2.

(7) The registration information meeting the requested condition transmitted by the information administrating server 3 is incorporated in a display frame prepared by the retrieving server 2, and is displayed in the retrieving person's personal computer (including a mobile telephone) 1.

(8) In a case where a retrieving person A has selected information delivered from the information administrating server 3, click information is transmitted to the retrieving server 2.

(9) The retrieving server 2 transmits the click information to the information administrating server 3.

(10) The information administrating server 3 records the click information into a charge database.

Next, as shown in FIG. 3, (11) charged amount-of-money information is requested of the information administrating server 3 from the information administrating personal computer 4.

(12) The information administrating server 3 confirms the charge data base, and transmits the charged amount-of-money information to the information administrating personal computer 4.

(13) An information administrator A charges the information provider on the basis of the charged amount-of-money information.

(14) Payment amount-of-money information is requested of the information administrating server 3 from the information administrating personal computer 4.

(15) The information administrating server 3 confirms the charge data base, and transmits the payment amount-of-money information to the information administrating personal computer 4.

(16) The information administrator A makes a payment to the retrieving site company on the basis of the payment amount-of-money information.

The above is the flow of information in the entirety of the system.

Next, a specific operation will be explained.

1. Registration of the Retrieving Site Company

The retrieving site company that desires to get the retrieval result of the information administrating server 3 has to register a company name, an address, a profit-sharing ratio, a keyword retrieval correspondence/non-correspondence, a category retrieval correspondence/non-correspondence, etc. (retrieving site company registration).

Figure 4:
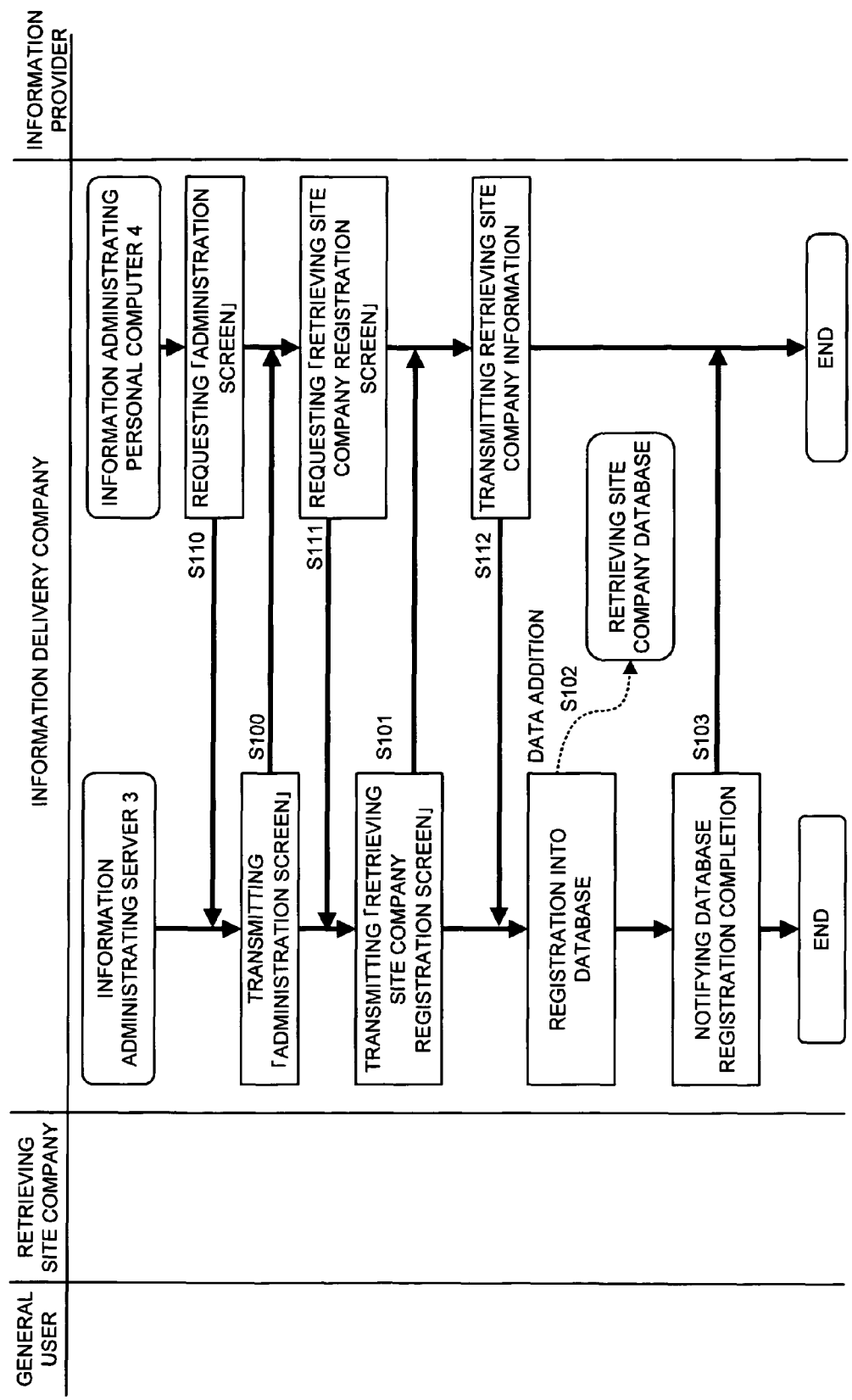
[FIG.4]

Thereupon, an operation of registering the retrieving site company will be explained. FIG. 4 is an operational flowchart of registering the retrieving site company.

At first, an information administrator B makes an access to the information administrating server 3 from the information administrating personal computer 4 (S110). The information administrating server 3 transmits an administration screen (S100). On example of the administration screen is shown in FIG. 5.

The information administrator B selects a retrieving site company registration button, and requests a retrieving site company registration screen (S111). The information administrating server 3 transmits the retrieving site company registration screen (S101). One example of the retrieving site company registration screen is shown in FIG. 6.

The information administrator B inputs the retrieving site company information into the retrieving site company registration screen and transmits it (S112). The information administrating server 3 records the retrieving site company information into the retrieving site company database (S102). One example of the retrieving site company database is shown in FIG. 7. Additionally, a key of the retrieving site company database is a retrieval site number. The information administration server 3 transmits the fact that the retrieving site company registration has been completed (S103).

In such a manner, the registration of the retrieving site company is carried out.

2. Registration of the Information Provider

Figure 8:
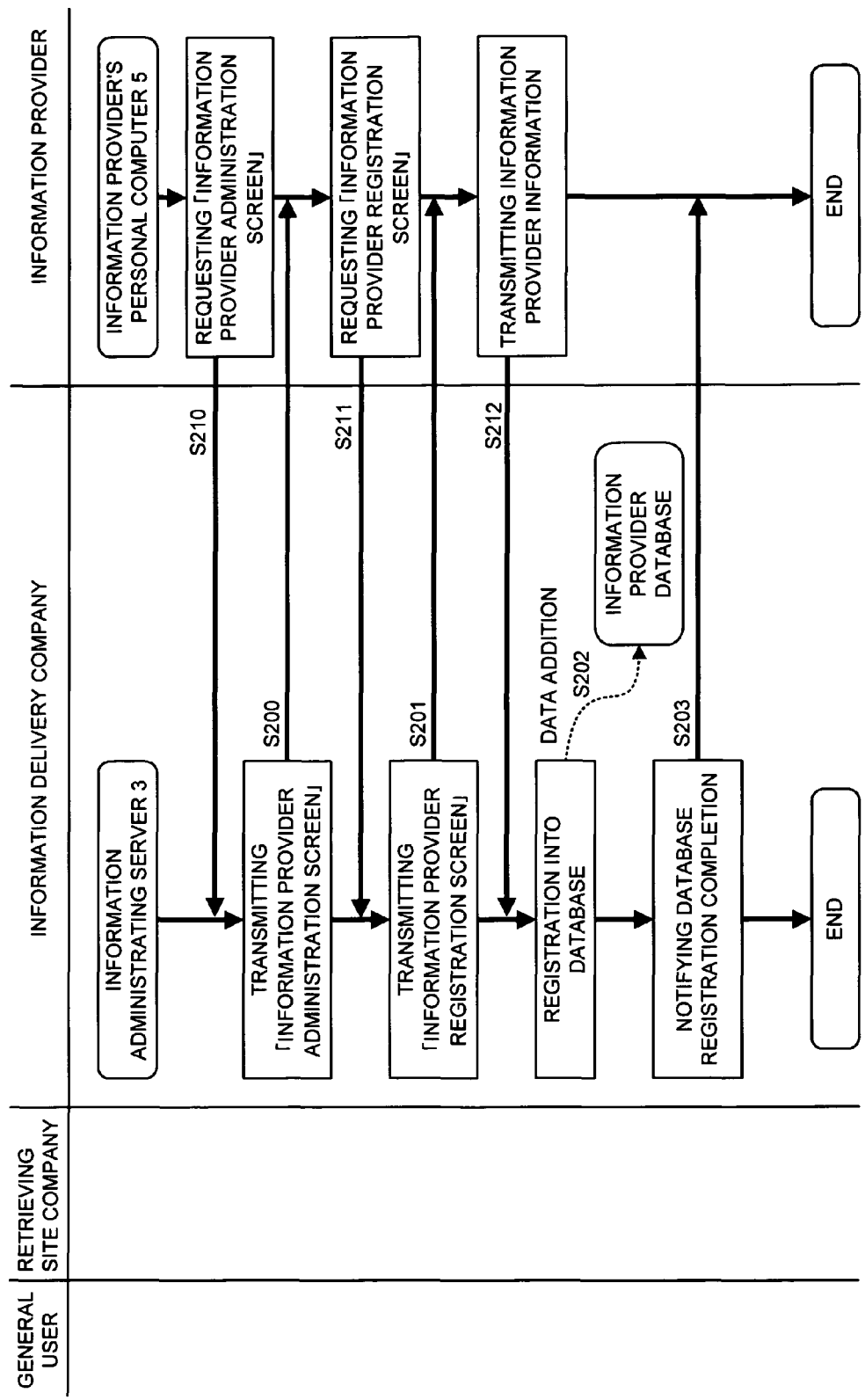
[FIG.8]

The information provider, who desires that information is displayed in the retrieval result of the retrieving person's personal computer (including a mobile telephone) 1, has to register a company name, an address, etc. (information provider registration). Thereupon, an operation of registering the information provider will be explained. FIG. 8 is an operational flowchart of registering the information provider.

At first, an information provider C makes an access to the information administrating server 3 from the information provider's personal computer 5 (S210).

The information administrating server 3 transmits an information provider administration screen (S200). On example of the information provider administration screen is shown in FIG. 9.

The information provider C selects an information provider registration button, and requests an information provider registration screen (S211). The information administrating server 3 transmits the information provider registration screen (S201). One example of the information provider registration screen is shown in FIG. 10.

The information provider C inputs information provider information into the information provider registration screen and transmits it (S212).

The information administrating server 3 records the information provider information into the information provider database (S202). One example of the information provider database is shown in FIG. 11. Additionally, a key of the information provider database is an information provider number.

The information administration server 3 transmits the fact that the information provider registration has been completed (S203).

In such a manner, the registration of the information provider is carried out.

3. Registration of a Linkage of the Retrieval Keyword and the Information Category.

Figure 12:
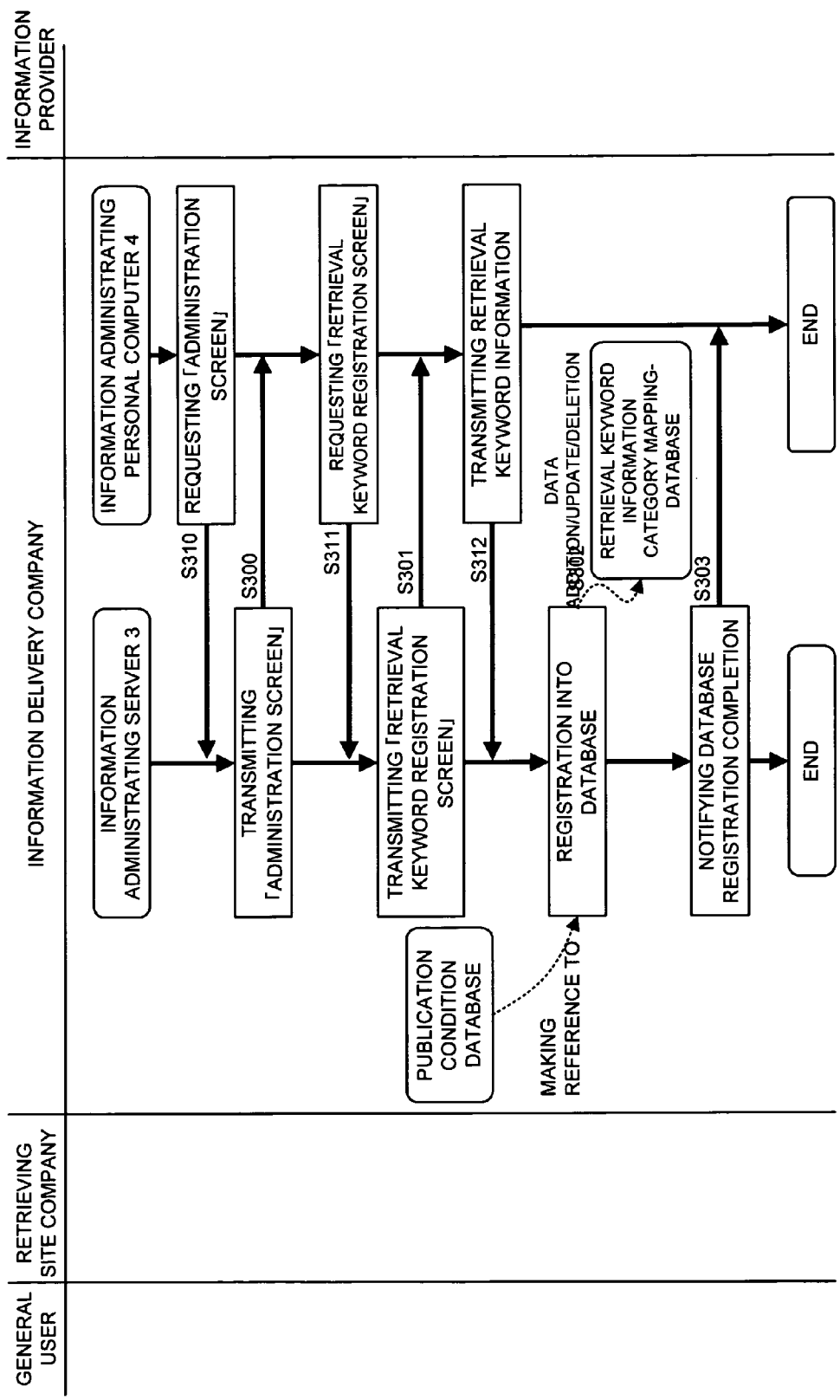
[FIG.12]

There exists a necessity for registering the linkage of the information category and the retrieval keyword (registration of the information category and the retrieval keyword). Thereupon, an operation of registering the linkage of the retrieval keyword and the information category will be explained. FIG. 12 is an operational flowchart of registering the linkage of the retrieval keyword and the information category.

At first, the information administrator B makes an access to the information administrating server 3 from the information administrating personal computer 4 (S310).

The information administrating server 3 transmits the administration screen (S300). This administration screen is one shown in FIG. 5.

The information administrator B selects a retrieval keyword registration button, and requests a retrieval keyword registration screen (S311). The information administrating server 3 transmits the retrieval keyword registration screen (S301). This retrieval keyword registration screen is one shown in FIG. 10.

The information administrator B inputs retrieval keyword information into the retrieval keyword registration screen and transmits it (S312).

The information administrating server 3 records the retrieve keyword information into the retrieve keyword information category mapping-database (S302). One example of the retrieve keyword information category mapping-database is shown in FIG. 13. Additionally, a key of the retrieve keyword information category mapping-database is retrieve keyword, and this key is given, thereby allowing the information category number to be specified.

The information administration server 3 transmits the fact that the retrieve keyword registration has been completed (S303).

In such a manner, the registration of the linkage of the information category and the retrieval keyword is carried out.

4. Registration of a Linkage of the Retrieving Site Company category and the Information Category.

Figure 14:
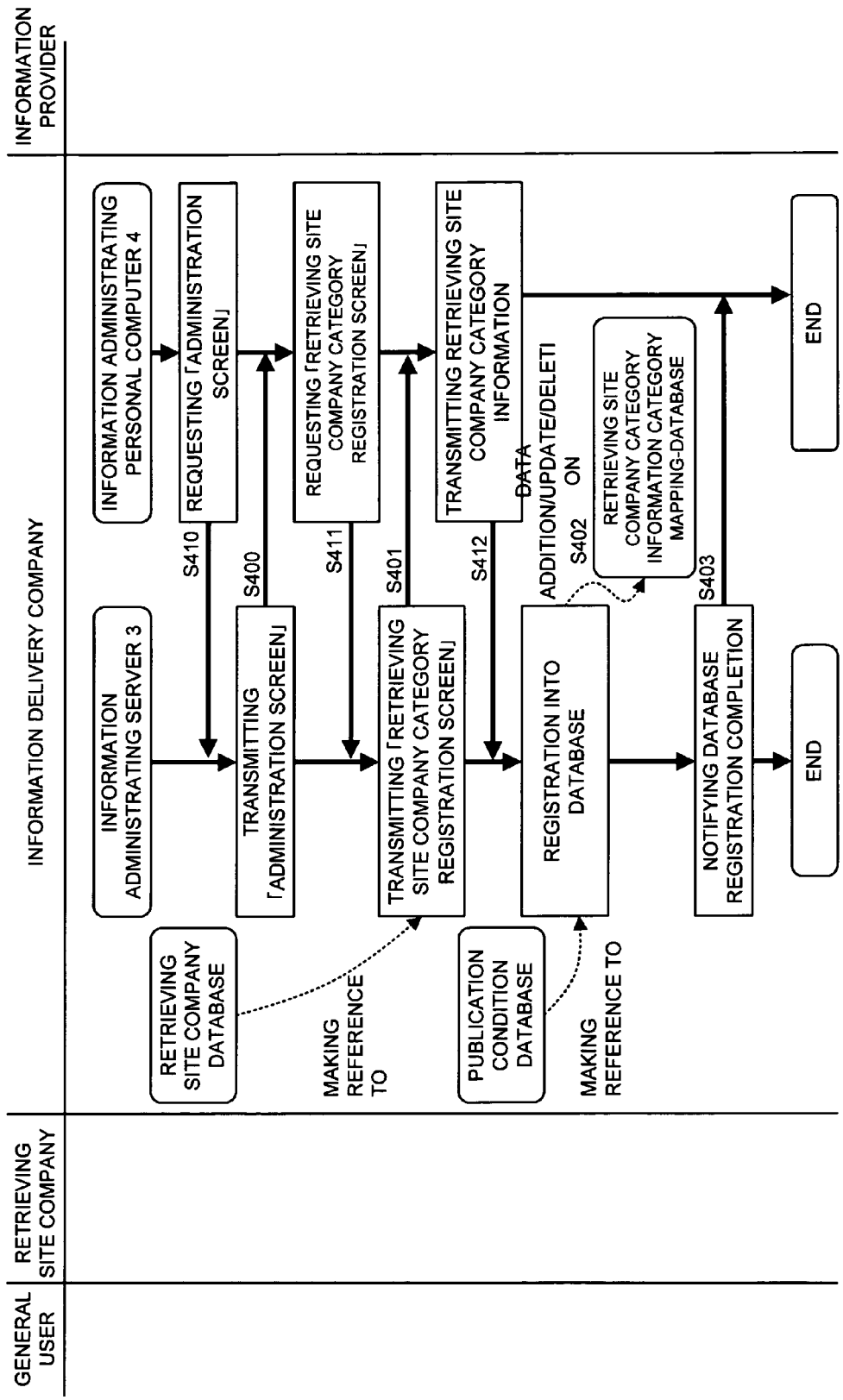
[FIG.14]

There exists a necessity for registering the linkage of the information category and the retrieving site company category (registration of the information category and the retrieval category). Thereupon, an operation of registering the linkage of the information category and the retrieving site company category will be explained. FIG. 14 is an operational flowchart of registering the linkage of the information category and the retrieving site company category.

The information administrator B makes an access to the information administrating server 3 from the information administrating personal computer 4 (S410).

The information administrating server 3 transmits the administration screen (S400). This administration screen is one shown in FIG. 5.

Figure 15:
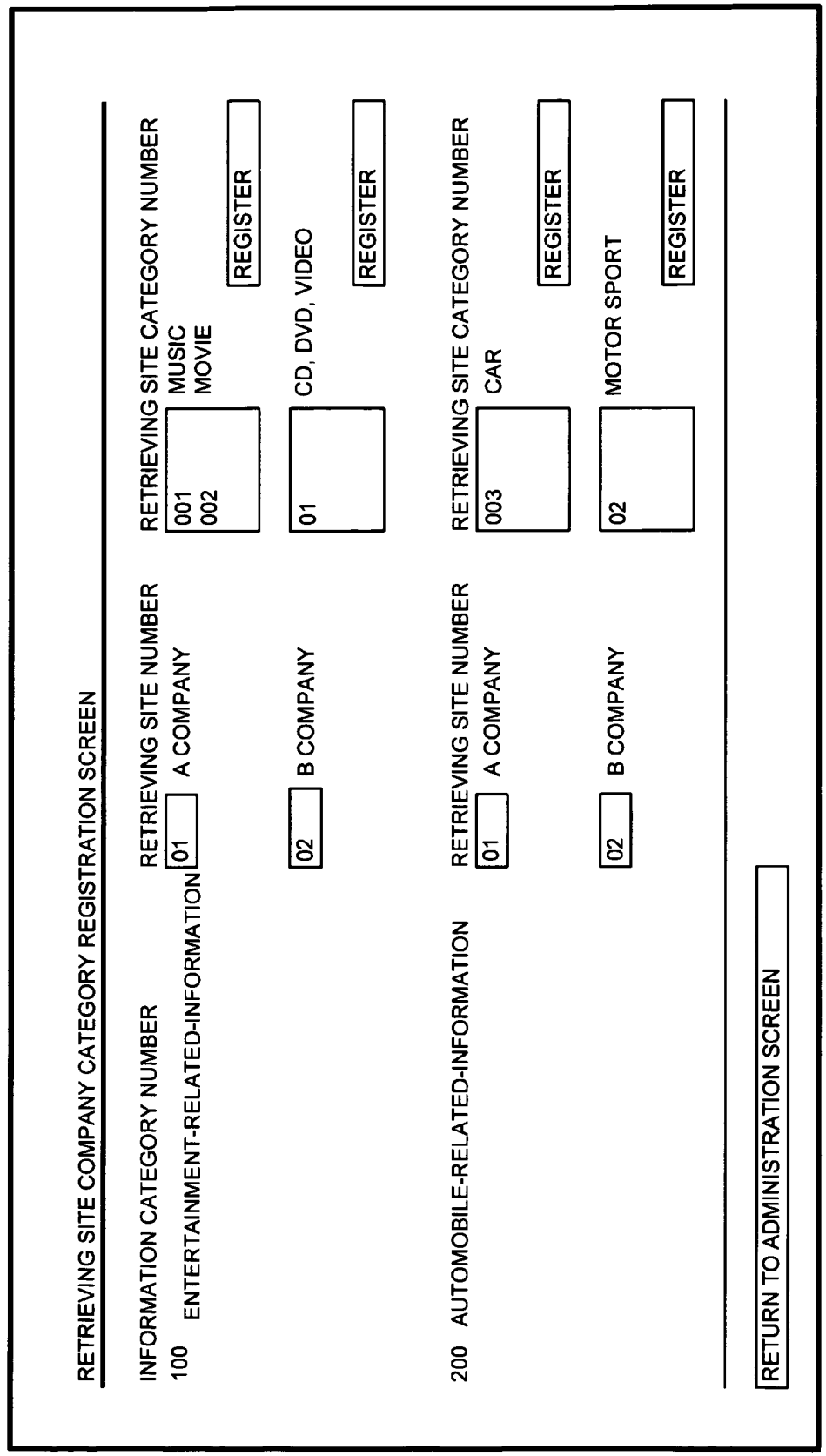
[FIG.15]

The information administrator B selects a retrieving site company category registration button, and requests a retrieving site company category registration screen (S411). The information administrating server 3 transmits the retrieving site company category registration screen (S401). One example of the retrieving site company category registration screen is shown in FIG. 15.

The information administrator B inputs retrieval category information into the retrieving site company category registration screen and transmits it (S412).

The information administrating server 3 records the retrieve category information into the retrieving site company category information category mapping-database (S402). One example of the retrieving site company category information category mapping-database is shown in FIG. 16. Additionally, a key of the retrieving site company category information category mapping-database is the retrieval site number and a retrieval site category number, and these keys are given, thereby allowing the information category number to be specified. The information administration server 3 transmits the fact that the retrieve category registration has been completed (S403).

In such a manner, the registration of the linkage of the information category and the retrieval category is carried out.

5. Registration of a Publication Condition

Figure 17:
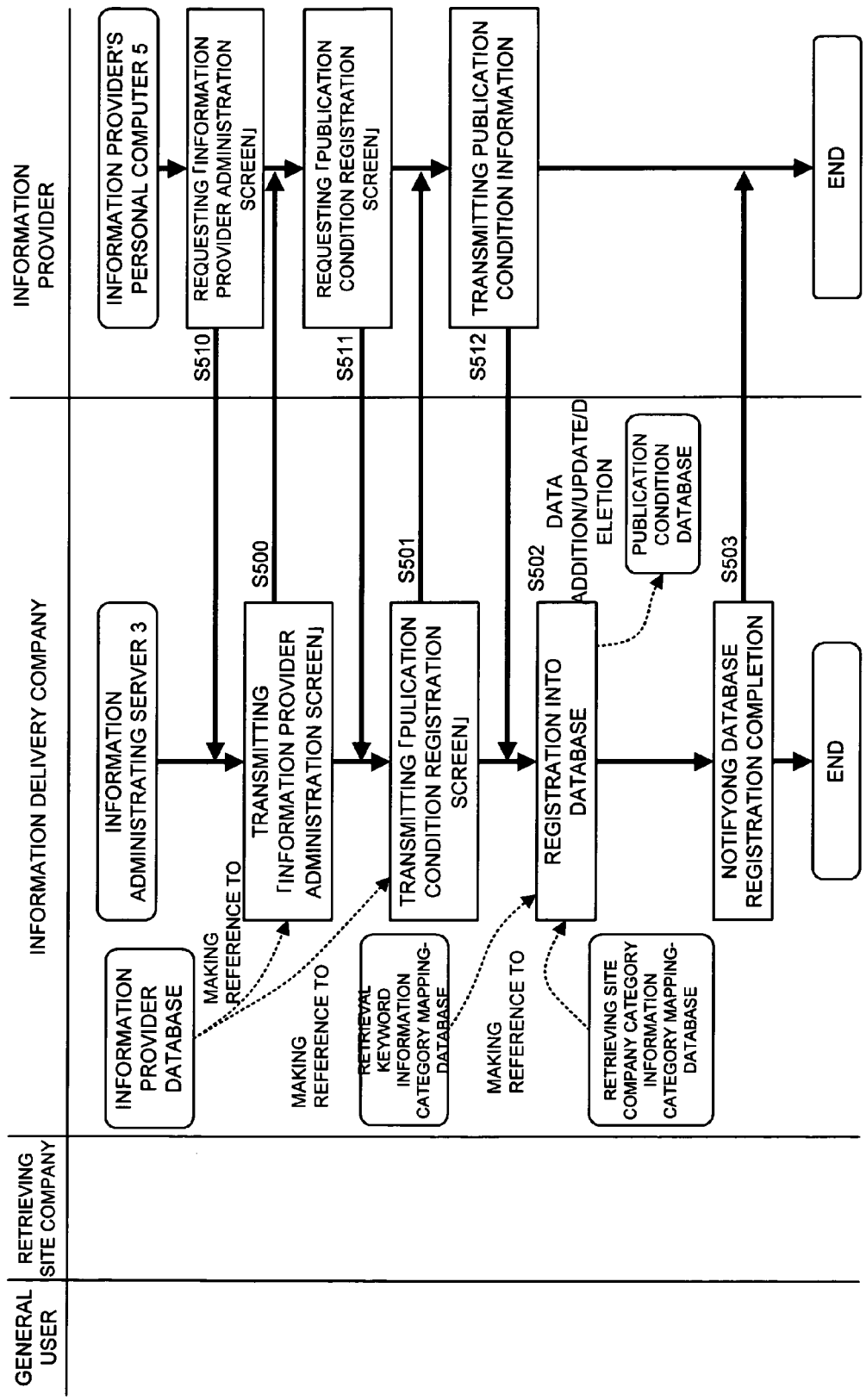
[FIG.17]

The information provider, who desires that information is displayed in the retrieval result of the retrieving person's personal computer (including a mobile telephone) 1, has to register a publication content, a bid amount of money, a budget, etc. for each category that is utilized (publication condition registration). Thereupon, an operation of registering the publication condition will be explained. Additionally, the so-called bid amount of money is an amount of money that is paid when the retrieving person has clicked the information, which the information provider desires is displayed. FIG. 17 is an operational flowchart of registering the publication condition.

The information provider C makes an access to the information administrating server 3 from the information provider's personal computer 5 (S510). The information administrating server 3 transmits an information provider administration screen (S500). The information provider administration screen is one shown in FIG. 9.

The information provider C selects a publication condition registration button, and requests a publication condition registration screen (S511).

The information administrating server 3 transmits the publication condition registration screen (S501). One example of the publication condition registration screen is shown in FIG. 18.

The information provider C inputs publication condition information into the publication condition registration screen and transmits it (S512).

The information administrating server 3 records the publication condition information into a publication condition database (S502). One example of the publication condition database is shown in FIG. 19. Additionally, a key of the publication condition database is the information category, and this key is given, thereby allowing the information provider number, the bid amount of money and the information content to be specified.

The information administration server 3 transmits the fact that the publication condition registration has been completed (S503).

In such a manner, the registration of the publication condition is carried out.

6. Process of the Retrieval Result Display.

Figure 20:
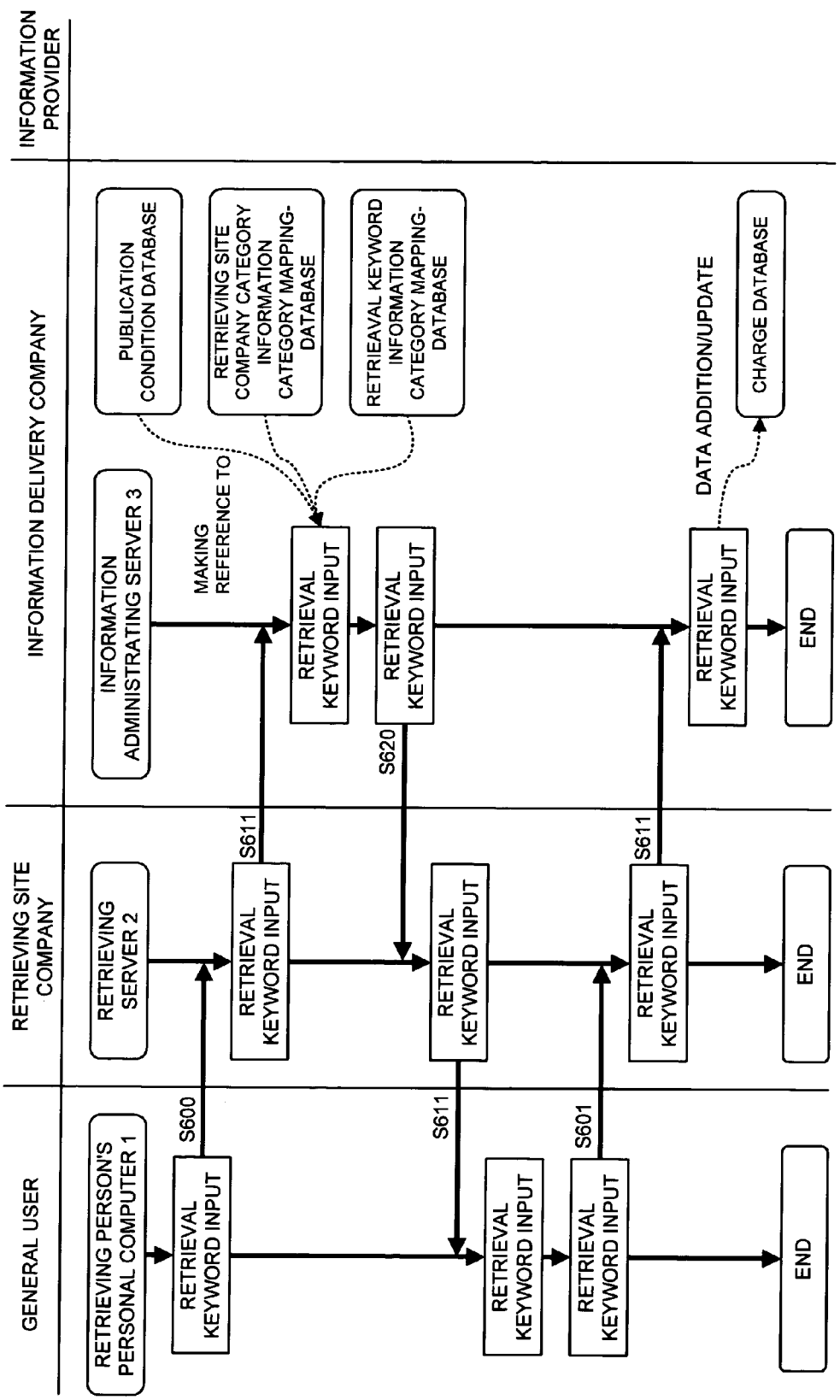
[FIG.20]

The process in a case where a retrieving person A utilizes the retrieving person's personal computer (including a mobile telephone) 1 for retrieving will be explained by employing FIG. 20.

The retrieving person A makes an access to the retrieving server 2 by making a retrieving operation in the retrieving person's personal computer (including a mobile telephone) 1, and requests the retrieval result (S600).

The retrieving server 2 makes an access to the information administrating server 3 and requests the registration information that meets the condition (S610).

The information administrating server 3 confirms the publication condition database, and extracts the registration information that meets the condition. The information administrating server 3 decides the displaying priority order according to the ratio of the bid amount of money of each information over the sum of bid amounts of money of all extracted pieces of information.

Herein, the method of deciding the displaying priority order will be explained.

The decision of the displaying priority order is based upon the ratio of the bid amount of money of each information over the sum of bid amounts of money of all corresponding pieces of information.

For example, in a case where the corresponding advertisement is [life insurance-related-information] (see FIG. 21), the sum of bid amounts of money is 100 yen (50+20+10+10+10). Thus, the ratio of the bid amount of money of each information over the sum of bid amounts of money of all corresponding pieces of information becomes 50% ($^{50}/_{100}$) with Aiu Insurance Service, 20% (20/100) with Insurance Total Portal, 10% ($^{10}/_{100}$) with Akihabara Life Insurance, 10% ($^{10}/_{100}$) with Second Life Insurance, and 10% ($^{10}/_{100}$) with Roppongi Life, respectively.

The decision of the second rank of the displaying priority order is based upon the ratio of the bid amount of money of each information over the sum of bid amounts of money of all pieces of information except the information of which the displaying priority order has been decided as a first rank. If it is assumed that the displaying priority order of Aiu Insurance Service is a first rank, the sum of bid amounts of money for deciding the second rank of the displaying priority order is 50 yen (20+10+10+10). Thus, the ratio of the bid amount of money of each information over the sum of bid amounts of money of all remaining pieces of information becomes 40% (20/50) with Insurance Total Portal, 20% (10/50) with Akihabara Life Insurance, 20% (10/50) with Second Life Insurance, and 20% (10/50) with Roppongi Life, respectively.

This is repeated until the displaying priority order of all pieces of information that exists in the corresponding information category is decided.

And, its result content information is transmitted to the retrieving server 2 (S620).

The registration information meeting the requested condition transmitted by the information administrating server 3 is incorporated into the retrieval result prepared by the retrieving server 2, and is displayed in the retrieving person's personal computer (including a mobile telephone) 1.

In a case where the retrieving person A has selected the information delivered from the information administrating server 3, the click information is transmitted to the retrieving server 2 (S601).

The retrieving server 2 transmits the click information of the retrieving person A to the information administrating server 3 (S611).

The information administrating server 3 records the click information into the charge database (S621).

Herein, the information administrating server 3 will be further explained in details.

In the information administrating server 3, it is also possible that the means for deciding the displaying order is configured of hardware; however normally, the means is realized with a computer program.

Figure 28:
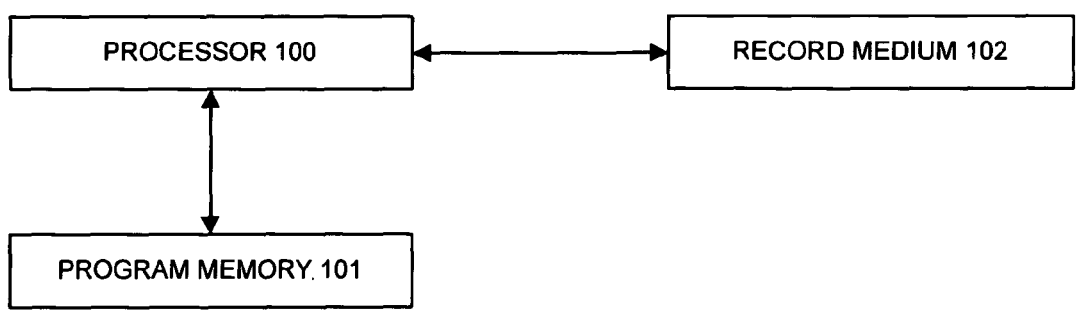
[FIG.28]

FIG. 28 is a general block configuration view of the information administrating server 3 having the means for deciding the displaying order of the present invention implemented.

The information administrating server 3 shown in FIG. 28 is comprised of a processor 100, a program memory 101, and a memory medium 102. The memory medium 102 can be a separate memory medium, and can be a memory region that is comprised of the identical memory medium. A magnetic memory medium such as a hard disc can be employed as the memory medium.

In the program memory 101 is filed a program for causing the processor 100 to operate as the foregoing means for deciding the displaying order, and this program allows the processor 100 to operate.

In the memory medium 102 is filed the foregoing retrieving site company database, retrieval keyword information category mapping-database, retrieving site company category information category mapping-database, information provider database, publication condition database, and charge database.

Next, the foregoing operation of deciding the displaying order will be explained in details.

The processor 100 reads out corresponding information from the publication condition database. Herein, the case where the requested information is the life insurance-related-information is explained, and the information obtained by extracting only the life insurance-related-information from the information that is listed in the publication condition database shown in FIG. 19 is shown in FIG. 21. In FIG. 21, the category number of information, the information provider number, the bid amount of money, the information content are correspondingly stored. Herein, the so-called bid amount of money is an amount of money that is paid to the information administrator in a case where the information is displayed and this information has been clicked by the information retrieving person.

Conventionally, the displaying order responding to the bid amount of money is decided; however in the present invention, the displaying order is not decided responding to the bid amount of money, but is decided with an probability based upon the ratio of the bid amount of money over the sum of bid amounts of money.

With the method of deciding the displaying order, the following equation is computed whenever the order, i.e. the first rank, the second rank, etc. is decided.

A probability based upon a ratio of a bid amount of money over a sum of bid amounts of money=(a bid amount of money of each corresponding information)/(a sum of bid amounts of money of corresponding pieces of information)  Equation (1)

Hereinafter, a specific example of the method of deciding the pieces of information of which the displaying orders are a first rank to a third rank respectively will be explained.

For example, in the example of FIG. 21, the sum of bid amounts of money is 100 (50+20+10+10+10) yen. Thus, the ratio (probability) of the bid amount of money of each information over the sum of bid amounts of money of all corresponding pieces of information in deciding the first rank of the displaying order becomes ½ (50/100) with Aiu Insurance Service, ⅕ (20/100) with Insurance Total Portal, 1/10 (10/100) with Akihabara Life Insurance, 1/10 (10/100) with Second Life Insurance, and 1/10 (10/100) with Roppongi Life, respectively.

Next, a computation is performed for deciding the displaying order based upon the calculated probability. In the foregoing example, the numerical value of 1 to 100 is given to each information responding to the ratio of each information. For example, the numerical value of 1 to 50 is allocated to Aiu Insurance Service, the numerical value of 51 to 70 to Insurance Total Portal, the numerical value of 71 to 80 to Akihabara Life Insurance, the numerical value of 81 to 90 to Second Life Insurance, and the numerical value of 91 to 100 to Roppongi Life, respectively. And, a random number ranging from 1 up to 100 is generated, and the information of which the random number value and the allocated numerical value coincide with each other is assumed to rank first in the displaying order.

Continuously, the method of deciding the second rank of the displaying order will be explained.

With the method of deciding the information of which the displaying order is a second rank, the similar computation to that of the forgoing method is performed; however the information of which the displaying order has been already decided as a first rank is not taken into consideration. For example, in a case where Insurance Total Portal has become first-ranked in the displaying order, the bid amount of money of Insurance Total Portal is not counted in deciding the second rank, and the sum of bid amounts of money becomes 80 (50+10+10+10). Thus, the probability of the bid amount of money of each information over the sum of bid amounts of money of all corresponding pieces of information in deciding the second rank of the displaying order becomes ⅝ (50/80) with Aiu Insurance Service, ⅛ (10/80) with Akihabara Life Insurance, ⅛ (10/80) with Second Life Insurance, and ⅛ (10/80) with Roppongi Life, respectively.

Next, a computation is performed for deciding the second rank of the displaying order based upon the calculated probability. The numerical value of 1 to 80 is given to each information responding to the ratio (probability) of each information. For example, the numerical value of 1 to 50 is allocated to Aiu Insurance Service, the numerical value of 51 to 60 to Akihabara Life Insurance, the numerical value of 61 to 70 to Second Life Insurance, and the numerical value of 71 to 80 to Roppongi Life, respectively. And, a random number ranging from 1 up to 80 is generated, and the information of which the random number value and the allocated numerical value coincide with each other is assumed to rank second in the displaying order.

Continuously, the method of deciding the third rank of the displaying order will be explained.

With the method of deciding the information of which the displaying order is a third rank, the similar computation to that of the forgoing method is performed; however the pieces of information of which the displaying order has been already decided as a first rank and a second rank respectively are not taken into consideration. For example, in a case where Insurance Total Portal has become first-ranked in the displaying order, and Aiu Insurance Service has become second-ranked therein, the bid amounts of money of Insurance Total Portal and Aiu Insurance Service are not counted in deciding the third rank, and the sum of bid amounts of money becomes 30 (10+10+10). Thus, the ratio (probability) of the bid amount of money of each information over the sum of bid amounts of money of all corresponding pieces of information in deciding the third rank of the displaying order becomes $\frac{1}{3}$ ($\frac{10}{30}$) with Akihabara Life Insurance, $\frac{1}{3}$ ($\frac{10}{30}$) with Second Life Insurance, and $\frac{1}{3}$ ($\frac{10}{30}$) with Roppongi Life, respectively.

The numerical value of 1 to 30 is given responding to the ratio of each information. For example, the numerical value of 1 to 10 is allocated to Akihabara Life Insurance, the numerical value of 11 to 20 to Second Life Insurance, and the numerical value of 21 to 30 to Roppongi Life, respectively. And, a random number ranging from 1 up to 30 is generated, and the information of which the random number value and the allocated numerical value coincide with each other is assumed to rank third in the displaying order.

In accordance with such a method of deciding the displaying order, the larger the bid amount of money is, the higher the probability that the displaying order becomes high-ranked is; however there is the possibility that the information of which the bid amount of money is small ranks high in the displaying order.

In addition hereto, also in a case where the information of which the bid amount of money is large has been omitted in the displaying, the possibility of being selected in deciding the information that is to be displayed next becomes high.

One example of the program for allowing such an operation to be performed is shown below. Additionally, in the program mentioned below, $client_id signifies a ranking having an advertiser ID filed, $click_amount signifies a ranking having a bid amount of money of each advertisement filed, $ad_count signifies the number of advertisements that are an object of delivery, and $max_ad signifies the number of requested advertisements (where, $max_ad<=$ad_count). In addition hereto, with each function, an explanatory note is given on the program.

```
function ad_sort( $client_id, $click_amount, $ad_count,
$max_ad ){
    for( $cnt = 0; $cnt < $max_ad; $cnt++ ){
        $bid_sum = 0;
        for( $cnt2 = 0; $cnt2 < $ad_count; $cnt2++ ){
            // a sum of bid amounts of money of pieces of object
information except information of which an order has been
already decided is obtained.
            $bid_sum += $click_amount[$cnt2];
            // a sum of bid amounts of money from a forehand
advertisement is filed in a ranking sum.
            if( $click_amount[$cnt2] > 0 ) {
                $sum[$cnt2] = $bid_sum;
            }else{ // a zero is set in a case where an order has
already been decided.
                $sum[$cnt2] = 0;
            }
        }
    }
    // information that is an object of display is decided
with a range of random numbers assumed to be 1 to a sum of
bid amounts of money.
    $result = rand (1,$bid_sum);
    // information that is an object of display is searched
for.
    for( $cnt2 = 0; $cnt2 < $ad_count; $cnt2++ ){
        if( $result <= $sum[$cnt2] ){
            // a bid amount of money of information of which a
displaying order has been already decided is set to zero.
            $click_amount[$cnt2] = 0;
            // ID of an advertiser is set in a ranking of a
displaying order.
            $ranking[$cnt] = $client_id[$cnt2];
            break;
        }
    }
}
// a ranking having a displaying order filed is returned.
return $ranking;
}
```

Next, an applicable example of the foregoing method of deciding the displaying order will be explained.

In the foregoing embodiment, in a case where the retrieving person A has selected the information delivered from the information administrating server 3, the click information is transmitted to the retrieving server 2, and the retrieving server 2 transmits the click information of the retrieving person A to the information administrating server 3. And, the information administrating server 3 makes it a rule to record the click information into the charge database. Thereupon, as an applicable example, the information administrating server 3 is configured to record the number of times of display of information and the click number of its information, and a click through rate as well that is derived from these values is employed in deciding the displaying order.

The so-called click through rate, which signifies, to the number of times information has been displayed, the ratio of the click number based upon its displaying, is one expressed by the following equation.

Click through rate=(the click number for displayed information)/(the number of times of display)  Equation (2)

This click through rate is reflected into the foregoing probability of the displaying order as shown in the following equation.

A degree at which display of corresponding information is decided=(a bid amount of money of corresponding information)/(a sum of bid amounts of money of corresponding pieces of information)×a click through rate)  Equation (3)

Specifically, the equation (3) is computed whenever the order, i.e. the first rank, the second rank, etc. is decided. For example, in the example of FIG. 21, it is assumed that the click through rate of each of Aiu Insurance Service, Insurance Total Portal, Akihabara Life Insurance, Second Life Insurance, and Roppongi Life is assumed to be $\frac{1}{3}$, $\frac{1}{2}$, $\frac{1}{2}$, $\frac{1}{3}$, and $\frac{1}{3}$, respectively, the degree of each information becomes $\frac{10}{60}=\frac{1}{6}(\frac{1}{2}\times\frac{1}{3})$ from the equation (3) with Aiu Insurance Service, $\frac{6}{60}=\frac{1}{10}(\frac{1}{5}\times\frac{1}{2})$ with Insurance Total Portal, $\frac{3}{60}=\frac{1}{20}(\frac{1}{10}\times\frac{1}{2})$ with Akihabara Life Insurance, $\frac{2}{60}=\frac{1}{30}(\frac{1}{10}\times\frac{1}{3})$ with Second Life Insurance, and $\frac{2}{60}=\frac{1}{30}(\frac{1}{10}\times\frac{1}{3})$ with Roppongi Life, respectively.

Thus, the probability that the displaying order of each piece of information becomes first-ranked becomes $\frac{10}{23}$ with Aiu Insurance Service, 6/23 with Insurance Total Portal, 3/23 with Akihabara Life Insurance, 2/23 with Second Life Insurance, and 2/23 with Roppongi Life, respectively.

Next, the numerical value ranging 1 to 23 is given responding to the ratio of each information. For example, the numerical value of 1 to 10 is allocated to Aiu Insurance Service, the numerical value of 11 to 16 to Insurance Total Portal, the numerical value of 17 to 19 to Akihabara Life Insurance, the numerical value of 20 to 21 to Second Life Insurance, and the numerical value of 22 to 23 to Roppongi Life, respectively. And, a random number ranging from 1 up to 23 is generated, and the information of which the random number value and the allocated numerical value coincide with each other is assumed to rank first in the displaying order.

In accordance with such a method of deciding the displaying order, the larger the bid amount of money is, the higher the probability that the displaying order becomes high-ranked becomes is; however there is the possibility that the information of which the bid amount of money is small, but of which the click through rate is high ranks high in the display order.

7. Information Publication Fee Charge

Figure 22:
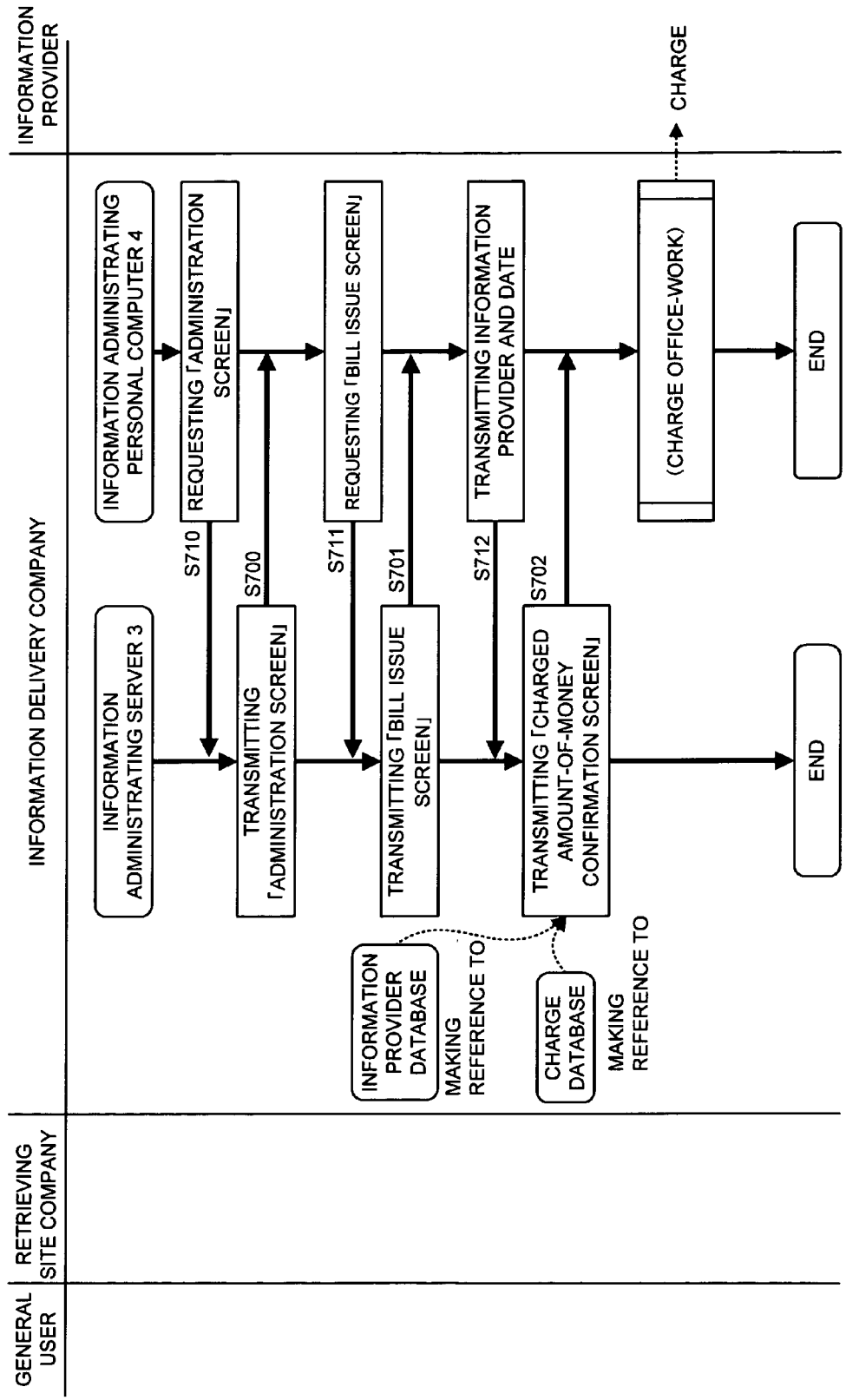
[FIG.22]

The information publication fee charge will be explained by employing a flowchart of FIG. 22.

The information administrator B makes an access to the information administrating server 3 from the information administrating personal computer 4 (S710).

The information administrating server 3 transmits the administration screen (S700). The administration screen is one shown in FIG. 5.

The information administrator B selects a bill issue button, and requests a bill issue screen (S711). The information administrating server 3 transmits the bill issue screen (S701). One example of the bill issue screen is shown in FIG. 23.

The information administrator B inputs the information provider and date into a charged amount-of-money confirmation screen and transmits it (S712). The information administrating server 3 confirms the charge database, and transmits the charged amount-of-money confirmation screen to the information administrating personal computer 4 (S702). One example of the charged amount-of-money confirmation screen is shown in FIG. 24.

8. Information Publication Fee Payment

Figure 25:
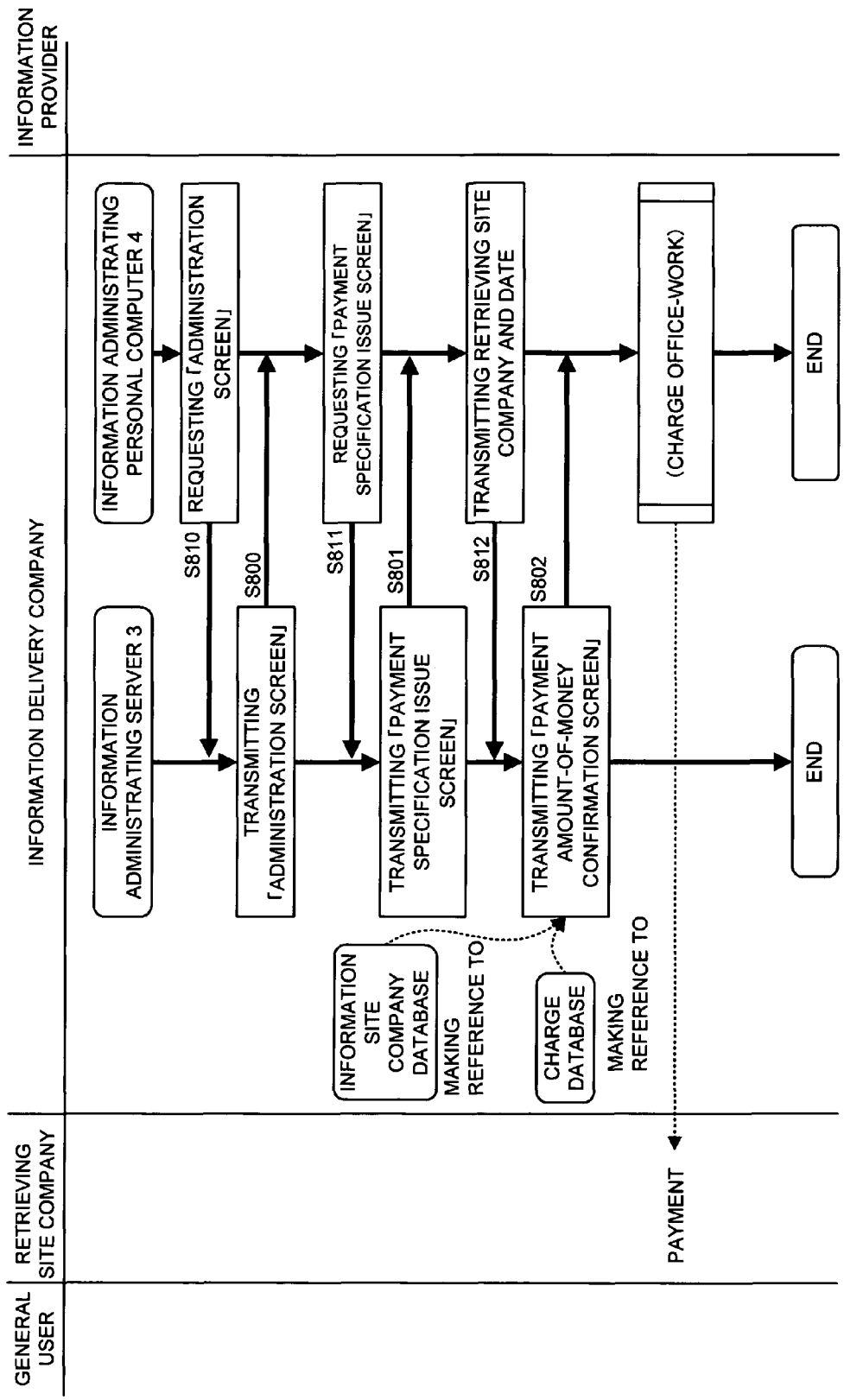
[FIG.25]

An operation of the information publication fee payment will be explained by employing FIG. 25.

The information administrator B makes an access to the information administrating server 3 from the information administrating personal computer 4 (S810).

The information administrating server 3 transmits the administration screen (S800). The administration screen is one shown in FIG. 5.

The information administrator B selects a payment specification issue button, and requests a payment specification issue screen (S811).

The information administrating server 3 transmits the payment specification issue screen (S801). One example of the payment specification issue screen is shown in FIG. 26.

The information administrator B inputs the retrieving site company and date into the bill issue screen and transmits it (S812).

The information administrating server 3 confirms the charge database, and transmits the payment amount-of-money confirmation screen to the information administrating personal computer 4 (S802). One example of the payment amount-of-money confirmation screen is shown in FIG. 27.

Above, an explanation of the embodiments of the present invention is finished.

Additionally, in this embodiment, the advertisement has been employed as an object of the publication priority order; however it is not limited to the advertisement, and it can be information similar hereto.

The invention claimed is:

1. An information providing system for providing information responding to a retrieval request from a terminal, characterized in comprising:
   a database having information, which an information provider provides, and a bid amount of money of said information stored correspondingly;
   a selecting means for responding to the retrieval request from the terminal, selecting m pieces of information, which become candidates for n pieces of information being presented to the terminal, from said database;
   a displaying order deciding means for:
      calculating a sum of bid amounts of money of m pieces of information, calculating a ratio of each of m pieces of information over said sum of bid amounts of money of m pieces of information, and deciding information of which a displaying order is a first rank based upon a probability proportional to magnitude of said ratio of the bid amount of money of each of m pieces of information;
      continuously calculating a sum of bid amounts of money of (m−1) pieces of information except the bid amount of money of the information of which the displaying order is a first rank, calculating a ratio of the bid amount of money of each of (m−1) pieces of information over said sum of bid amounts of money of (m−1) pieces of information, and deciding information of which the displaying order is a second rank based upon a probability proportional to magnitude of said ratio of the bid amount of money of each of (m−1) pieces of information;
      said computation is performed until information of which the displaying order is an (n−1)-th rank is decided; and
      calculating a sum of bid amounts of money of (m−n+1) pieces of information except the bid amount of money of the information of which the displaying order has been decided, calculating a ratio of the bid amount of money of each of (m−n+1) pieces over said sum of bid amounts of money of (m−n+1) pieces information, deciding information of which the displaying order is an n-th rank based upon a probability proportional to magnitude of said ratio of the bid amount of money of each of (m−n+1) pieces of information, and deciding the displaying order of information ranging from a first rank up to an n-th rank; and
   a means for transmitting information to the terminal so that information is displayed in said decided displaying order.

2. The information providing system according to claim 1, wherein:
   said information providing system comprises:
      a means for recording the number of times of display of each information in the terminal;
      a means for recording the click number of each information displayed in the terminal; and
      a means for calculating a ratio of the click number to said number of times of display for each selected information; and
   said displaying order deciding means decides the displaying order of information based upon a probability that is calculated from a ratio of the bid amount of money of information over said sum of bid amounts of money and a ratio of the click number to said number of times of display.

3. An information providing server for providing information responding to a retrieval request from a terminal, comprising:

a selecting means for responding to the retrieval request from the terminal, selecting m pieces of information, which become candidates for n pieces of information being presented to the terminal, from a database having information, which an information provider provides, and a bid amount of money of said information stored correspondingly;

a displaying order deciding means for:

calculating a sum of bid amounts of money of m pieces of information, calculating a ratio of each of m pieces of information over said sum of bid amounts of money of m pieces of information, and deciding information of which a displaying order is a first rank based upon a probability proportional to magnitude of said ratio of the bid amount of money of each of m pieces of information;

continuously calculating a sum of bid amounts of money of (m−1) pieces of information except the bid amount of money of the information of which the displaying order is a first rank, calculating a ratio of the bid amount of money of each of (m−1) pieces of information over said sum of bid amounts of money of (m−1) pieces of information, and deciding information of which the displaying order is a second rank based upon a probability proportional to magnitude of said ratio of the bid amount of money of each of (m−1) pieces of information;

said computation is performed until information of which the displaying order is an (n−1)-th rank is decided; and calculating a sum of bid amounts of money of (m−n+1) pieces of information except the bid amount of money of the information of which the displaying order has been decided, calculating a ratio of the bid amount of money of each of (m−n+1) pieces over said sum of bid amounts of money of (m−n+1) pieces information, deciding information of which the displaying order is an n-th rank based upon a probability proportional to magnitude of said ratio of the bid amount of money of each of (m−n+1) pieces of information, and deciding the displaying order of information ranging from a first rank up to an n-th rank; and a means for transmitting information to the terminal SO that information is displayed in said decided displaying order.

4. The information providing system according to claim 3, comprising:

a means for recording the number of times of display of each information in the terminal;

a means for recording the click number of each information displayed in the terminal; and a means for calculating a ratio of the click number to said number of times of display for each selected information;

wherein said displaying order deciding means operates so that the displaying order of information is decided based upon a probability that is calculated from a ratio of the bid amount of money of information over said sum of bid amounts of money and a ratio of the click number to said number of times of display.

5. An information providing method of providing information responding to a retrieval request from a terminal, comprising:

a selecting operation of responding to the retrieval request from the terminal, selecting m pieces of information, which become candidates for n pieces of information being presented to the terminal, from a database having information, which an information provider provides, and a bid amount of money of said information stored correspondingly;

a displaying order deciding operation executed by a computer:

calculating a sum of bid amounts of money of m pieces of information, calculating a ratio of each of m pieces of information over said sum of bid amounts of money of m pieces of information, and deciding information of which a displaying order is a first rank based upon a probability proportional to magnitude of said ratio of the bid amount of money of each of m pieces of information;

continuously calculating a sum of bid amounts of money of (m−1) pieces of information except the bid amount of money of the information of which the displaying order is a first rank, calculating a ratio of the bid amount of money of each of (m−1) pieces of information over said sum of bid amounts of money of (m−1) pieces of information, and deciding information of which the displaying order is a second rank based upon a probability proportional to magnitude of said ratio of the bid amount of money of each of (m−1) pieces of information;

said computation is performed until information of which the displaying order is an (n−1)-th rank is decided; and calculating a sum of bid amounts of money of (m−n+1) pieces of information except the bid amount of money of the information of which the displaying order has been decided, calculating a ratio of the bid amount of money of each of (m−n+1) pieces over said sum of bid amounts of money of (m−n+1) pieces information, deciding information of which the displaying order is an n-th rank based upon a probability proportional to magnitude of said ratio of the bid amount of money of each of (m−n+1) pieces of information, and deciding the displaying order of information ranging from a first rank up to an n-th rank; and transmitting information to the terminal so that information is displayed in said decided displaying order.

6. The information providing method according to claim 5, comprising:

recording the number of times of display of each information in a terminal and the click number of each information displayed in the terminal; and deciding the displaying order of information based upon a probability that is calculated from a ratio of the bid amount of money of information over said sum of bid amounts of money and a ratio of the click number to said number of times of display.

7. An advertisement information publishing system for providing advertisement information responding to a retrieval request from a terminal, comprising:

a database having advertisement information and a bid amount of money of said advertisement information stored correspondingly;

a selecting means for, responding to the retrieval request from the terminal, selecting advertisement information that becomes an object of display from said database;

an advertisement publishing order deciding means for deciding a publishing order of each advertisement information, being an object of display, based upon a probability that is calculated from a ratio of the bid amount of money of each of advertisement information that becomes an object of display over a sum of bid amounts of money of said advertisement information that becomes an object of display; and a means for transmitting advertisement information to the terminal so that an advertisement is displayed in said decided advertisement publishing order.

8. An advertisement information publishing method of providing advertisement information responding to a retrieval request from a terminal, comprising:

a selecting operation, responding to the retrieval request from the terminal, selecting advertisement information that becomes an object of display from a database having advertisement information and a bid amount of money of said advertisement information stored correspondingly;

an advertisement publishing order deciding operation of deciding a publishing order of each advertisement information, being an object of display, based upon a probability that is calculated from a ratio of the bid amount of money of each of advertisement information that becomes an object of display over a sum of bid amounts of money of said advertisement information that becomes an object of display; and transmitting advertisement information to the terminal so that an advertisement is displayed in said decided advertisement publishing order.

* * * * *